(12) United States Patent
Zhou et al.

(10) Patent No.: US 12,185,863 B2
(45) Date of Patent: Jan. 7, 2025

(54) BREWING CAVITY AND COFFEE BREWER PROVIDED WITH SAME

(71) Applicant: GUANGZHOU CONWIDE TECHNOLOGY CO., LTD., Guangdong (CN)

(72) Inventors: Linbin Zhou, Guangdong (CN); Xuebin Wang, Guangdong (CN)

(73) Assignee: GUANGZHOU CONWIDE TECHNOLOGY CO., LTD., Guangdong (CN)

( * ) Notice: Subject to any disclaimer, the term of this patent is extended or adjusted under 35 U.S.C. 154(b) by 678 days.

(21) Appl. No.: 17/612,572

(22) PCT Filed: Oct. 31, 2019

(86) PCT No.: PCT/CN2019/114656
§ 371 (c)(1),
(2) Date: Nov. 19, 2021

(87) PCT Pub. No.: WO2021/068308
PCT Pub. Date: Apr. 15, 2021

(65) Prior Publication Data
US 2022/0233016 A1    Jul. 28, 2022

(30) Foreign Application Priority Data
Oct. 10, 2019  (CN) .......................... 201910958683.4

(51) Int. Cl.
*A47J 31/36*   (2006.01)
*A23F 5/26*    (2006.01)
(Continued)

(52) U.S. Cl.
CPC ....... *A47J 31/3619* (2013.01); *A47J 31/0657* (2013.01); *A47J 31/4403* (2013.01); *A23F 5/26* (2013.01)

(58) Field of Classification Search
CPC ..... A23F 5/26; A47J 31/0657; A47J 31/3609; A47J 31/3619; A47J 31/3671;
(Continued)

(56) References Cited

U.S. PATENT DOCUMENTS

| | | | |
|---|---|---|---|
| 5,388,502 A * | 2/1995 | Hufnagl | A47J 31/3671 99/302 R |
| 6,220,147 B1 * | 4/2001 | Priley | A47J 31/4496 99/305 |

FOREIGN PATENT DOCUMENTS

| | | |
|---|---|---|
| CN | 203088756 | 7/2013 |
| CN | 106361158 | 2/2017 |

(Continued)

OTHER PUBLICATIONS

English Language Translation of Cited Prior Art Citation: Zhou, CN106361158 (Year: 2017).*

(Continued)

*Primary Examiner* — Dana Ross
*Assistant Examiner* — Joseph W Iskra
(74) *Attorney, Agent, or Firm* — JCIP GLOBAL INC.

(57) ABSTRACT

A brewing cavity and a coffee brewer including the brewing cavity are provided. The brewing cavity includes a brewing cavity shell and a brewing chamber having a groove with an inner diameter less than that of the brewing chamber. A side wall of the groove has a coffee outlet communicatively connected with an exterior. A bottom portion of the groove is provided with a through hole internally provided with a coffee seal ring. A pressure sealing water outlet element is fixedly mounted on an upper end surface of the groove. A filtering portion for filtering coffee is arranged above the pressure sealing water outlet element. A first sliding hole in the filtering portion, a second sealing sliding hole in the pressure sealing water outlet element and a third sealing sliding hole in the coffee seal ring are internally provided (Continued)

with discharge portion capable of sliding along the through hoe axially.

16 Claims, 13 Drawing Sheets

(51) Int. Cl.
  *A47J 31/06* (2006.01)
  *A47J 31/44* (2006.01)
(58) Field of Classification Search
  CPC ........ A47J 31/4403; A47J 31/06; A47J 31/36; A47J 31/3666
  USPC .......................................................... 99/286
  See application file for complete search history.

(56) References Cited

FOREIGN PATENT DOCUMENTS

| | | |
|---|---|---|
| CN | 209153203 | 7/2019 |
| CN | 209331809 | 9/2019 |
| WO | 2016177847 | 11/2016 |

OTHER PUBLICATIONS

"International Search Report (Form PCT/ISA/210) of PCT/CN2019/114656," mailed on Jun. 30, 2020, with English translation thereof, pp. 1-4.

* cited by examiner

BREWING CAVITY AND COFFEE BREWER PROVIDED WITH SAME

CROSS-REFERENCE TO RELATED APPLICATION

The application is a 371 of international application of PCT application serial no. PCT/CN2019/114656, filed on Oct. 31, 2019, which claims the priority benefit of China application No. 201910958683.4, filed on 10 Oct. 2019 and entitled "brewing cavity and coffee brewer provided with same" in the Patent Office of the People's Republic of China, the entire disclosure of each of the above mentioned patent applications is incorporated herein by reference and made a part of this specification.

BACKGROUND

Technical Field

The present invention relates to the technical field of coffee brewing, more particular to a brewing cavity. In addition, the present invention further relates to a coffee brewer including the brewing cavity.

Description of Related Art

An electronic technology is applied to brewing coffee, and automatic control in an overall process of brewing coffee such as powder grinding, powder pressing, powder filling, brewing and residual eliminating is realized, that is, a coffee brewer is created.

In an existing coffee brewer, extrusion of coffee powder and discharge of coffee grounds are realized by a piston system which includes many structural parts such as a left bracket, a right bracket, a cleaning nozzle, a piston combination, a piston sleeve, a front cover combination, a gear, a worm, a driving worm wheel, a piston sleeve travel switch and powder-free travel switch and so on.

However, when the existing coffee brewer makes coffee, the pressure in the brewing cavity will be decreased, and the brewing effect is poor. Moreover, as the sealing property in the brewing chamber is relatively poor, liquid leakage is easily caused in the brewing process, which results in a condition that coffee in the brewing cavity cannot be discharged fully from a coffee outlet.

In conclusion, how to increase the pressure in the brewing cavity and prevent liquid leakage when coffee is brewed is the problem to be settled urgently by those skilled in the art at present.

SUMMARY

For this purpose, it is thereof an object of the present invention to provide a brewing cavity. When the brewing cavity is used for brewing coffee, a relatively large pressure can be formed in the brewing cavity, and the sealing property of the brewing cavity is better, such that liquid leakage is avoided when the coffee is brewed.

It is thereof another object of the present invention to provide a coffee brewer including the brewing cavity. In order to achieve the object, the present invention provides a technical solution as follows.

A brewing cavity includes a brewing cavity shell rotatably arranged below a brewing assembly. The brewing cavity shell is internally provided with a brewing chamber for brewing coffee. The brewing cavity shell is provided with a brewing cavity opening that allows the brewing assembly to enter the brewing chamber to compact coffee powder in the brewing chamber and create a brewing pressure for the coffee. A bottom portion of the brewing chamber is provided with a groove with an inner diameter less than an inner diameter of the brewing chamber. A side wall of the groove is provided with a coffee outlet, and the coffee outlet is communicatively connected with an exterior.

A bottom portion of the groove is provided with a through hole with an axis consistent with an axis of the brewing chamber; an inner wall of the through hole is provided with a coffee seal ring; a pressure sealing water outlet element is fixedly mounted on an upper end surface of the groove; the pressure sealing water outlet element is provided with a coffee outlet hole communicated with the coffee outlet; and a filtering portion for filtering coffee is arranged above the pressure sealing water outlet element.

The filtering portion is provided with a first sliding hole; the pressure sealing water outlet element is provided with a second sealing sliding hole; the coffee seal ring is provided with a third sealing sliding hole; the first sliding hole, the second sealing sliding hole and the third sealing sliding hole are internally provided with a discharge portion capable of sliding along the through hoe axially; and the discharge portion is at least sealedly and slidably connected to the third sealing sliding hole.

Preferably, the brewing cavity opening is provided at the upper portion of the brewing cavity shell. The inner wall of the through hole is provided with a sealing second element fixing position protruding radially inwards. The coffee seal ring is an I-shaped seal ring, and the I-shaped seal ring is clamped on a top surface and a bottom surface of the second sealing element fixing position.

Preferably, the filtering portion is provided with a first screw hole. The pressure sealing water outlet element is provided with a second screw hole. The upper end surface of the groove is provided with a third screw hole, and the filtering portion and the pressure sealing water outlet element are fixed to the upper end surface of the groove via a bolt which penetrates through the first screw hole, the second screw hole and the third screw hole in sequence.

Preferably, the discharge portion comprises a discharge push rod and a discharge element arranged at an upper end of the discharge push rod, and the discharge push rod is at least sealedly and slidably connected to the second sealing sliding hole and the third sealing sliding hole.

The filtering portion is a metal filter screen or a plastic filter screen. The pressure sealing water outlet element is a silica gel element or a rubber element, and the coffee seal ring is a silica gel element or a rubber element.

Preferably, the coffee outlet hole is provided at one side of the second sealing sliding hole or the coffee outlet hole is provided on the second sealing sliding hole.

A coffee brewer includes a shell and the brewing cavity according to any one of the above solutions arranged in the shell.

Preferably, the brewing assembly includes a brewing head movably arranged in the shell in an up-down direction, the brewing cavity shell is rotatably arranged below the brewing head, and a diameter of the brewing head is matched with a diameter of the brewing cavity opening.

The brewing head is connected with a first power portion for driving the brewing head to move, and the brewing cavity shell is connected with a second power portion for driving the brewing cavity shell to rotate.

When coffee is brewed, the second power portion drives the brewing cavity shell to rotate, such that the brewing cavity opening is opposite to the brewing head, and the brewing head is driven by the first powder portion to move downwards to extend into the brewing cavity shell to be sealed so as to compact coffee powder in the brewing cavity shell and create a brewing pressure to the coffee.

When coffee grounds are discharged, the second power portion drives the brewing cavity shell to rotate reversely, such that the discharge portion is opposite to the brewing head, and the brewing head is driven by the first power portion to move downwards to push the discharge portion to move downwards, such that the discharge portion pushes the coffee grounds in the brewing chamber to be discharged from the brewing cavity opening.

Preferably, a lower portion of the discharge push rod of the discharge portion is fixedly connected to a pressure plate. The pressure plate is connected to an outer wall of the brewing cavity shell via an elastic element. One end of the elastic element abuts against a lower end surface of the through hole and another end of the elastic element abuts against the pressure plate. The discharge element is attached to an upper portion of the filtering portion via the elastic element. The brewing head pushes the pressure plate downwards to drive the discharge element to move downwards to discharge the coffee grounds, and the elastic element is used for driving the pressure plate to an original position after the coffee grounds are driven to be discharged.

Preferably, the elastic element is a reset spring, and a lower end of the discharge push rod penetrates through a middle hole of the reset spring and is connected to the pressure plate.

Preferably, the first power portion includes a first motor and a convex driving curved bar connected to a rotating shaft of the first motor, and a swing portion on a top portion of the driving curved bar is rotatably connected to a top portion of the brewing head via an oscillating bar, such that the brewing head moves along a linear channel arranged in the shell.

Or, the rotating shaft of the first motor is rotatably connected to the top portion of the brewing head through a screw for drive, such that the brewing head moves along the linear channel arranged in the shell. The brewing head controls an up-down moving distance of the brewing head via a microswitch driving position, the brewing head is provided with a water inlet joint or a lug, and a brewing bracket is provided with a sliding groove that is consistent with a length direction of the screw and is slidably matched with the water inlet joint or the lug.

Preferably, the shell is provided with a limiting block for limiting rotation of the driving curved bar, and the limiting block is arranged on a rotating trajectory on one side of the driving curved bar to prevent the brewing head from moving upwards or swinging under an action of hot water in the brewing cavity shell when water flows in.

Preferably, a width of a curved bar stopping portion in contact with the swing portion on the limiting block is at least a half of a width of the swing portion.

Preferably, the brewing head is provided with a ventilation pipe penetrating through an axial direction of the brewing head. A steam buoyancy valve capable of floating along with the hot water in the brewing cavity shell is arranged below the ventilation pipe, and when water vapor in the brewing cavity shell is discharged from the ventilation pipe, the steam buoyancy valve floats upwards along with the hot water in the brewing cavity shell to block the ventilation pipe.

Preferably, the pressure plate is an arc-shaped pressure plate opened toward a direction of the discharge push rod, and a surface of the arc-shaped pressure plate is provided with several pressure plate rotating shafts for contacting the brewing head.

Preferably, the filtering portion is fixedly connected to the lower portion of the brewing cavity via a first buckling position, a screw or a strong pressure.

Preferably, the second power portion includes a second motor arranged on a positioning bracket and a liquid outlet pipe in coupling transmission with a rotating shaft of the second motor via a gear portion, and the liquid outlet pipe is fixedly connected to the brewing cavity shell and is arranged on the axis of the brewing cavity shell.

The present invention provides a brewing cavity which includes a brewing cavity shell rotatably arranged below a brewing assembly. The brewing cavity shell is internally provided with a brewing chamber for brewing coffee. The brewing cavity shell is provided with a brewing cavity opening that allows the brewing assembly to enter the brewing chamber to compact coffee powder in the brewing chamber and create a brewing pressure for the coffee. A bottom portion of the brewing chamber is provided with a groove with an inner diameter less than an inner diameter of the brewing chamber. A side wall of the groove is provided with a coffee outlet. The coffee outlet is communicatively connected with an exterior.

A bottom portion of the groove is provided with a through hole with an axis consistent with an axis of the brewing chamber. An inner wall of the through hole is provided with a coffee seal ring. A pressure sealing water outlet element is fixedly mounted on an upper end surface of the groove. The pressure sealing water outlet element is provided with a coffee outlet hole communicated with the coffee outlet. A filtering portion for filtering coffee is arranged above the pressure sealing water outlet element.

The filtering portion is provided with a first sliding hole. The pressure sealing water outlet element is provided with a second sealing sliding hole. The coffee seal ring is provided with a third sealing sliding hole. The first sliding hole, the second sealing sliding hole and the third sealing sliding hole are internally provided with a discharge portion capable of sliding along the through hoe axially. The discharge portion is at least sealedly and slidably connected to the third sealing sliding hole.

The brewing cavity is used for brewing coffee. When coffee is brewed, the brewing assembly enters the brewing cavity along the brewing cavity opening to compact the coffee powder in the brewing cavity and create a brewing pressure for the coffee so as to complete the brewing of the coffee. In the brewing process, the pressure in the brewing cavity will be increased, and the brewed coffee will be discharged downwards along the filtering portion via the coffee outlet in the pressure sealing element.

The bottom portion of the brewing cavity shell provided by the present invention is provided with the groove. The bottom portion of the groove is provided with the through hole.

The through hole is internally provided with the coffee seal ring. The discharge portion capable of sliding axially along the through hole is sealedly and slidably connected in the coffee seal ring. The through hole and the brewing cavity are consistent in axis, and the discharge portion can move along the axis of the brewing cavity, such that the discharge portion can discharge residual coffee grounds in the brewing chamber after brewing coffee, thereby brewing preparation for next time coffee brewing.

The first sliding hole, the second sealing sliding hole and the third sealing sliding hole are internally provided with the discharge portion capable of sliding axially along the through hole, and the discharge portion penetrate through the first sliding hole, the second sealing sliding hole and the third sealing sliding hole simultaneously. When coffee is brewed, only the coffee outlet hole is communicated with the coffee outlet in the brewing cavity, and the coffee outlet is communicated with outer side. When the discharge portion is sealedly and slidably is at least connected to the third sealing sliding hole, the through hole in the bottom portion of the groove is blocked to prevent liquid leakage when the coffee is brewed. In addition, as the pressure sealing water outlet element is fixedly arranged on the upper end surface of the groove and does not move along with movement of the discharge portion, wear of the pressure sealing water outlet element is prevented, thereby increasing the internal pressure in the brewing chamber when the coffee is brewed.

The present invention further provides a coffee brewer. The shell of coffee brewer is internally provided with the brewing cavity. The pressure in the brewing cavity in a brewing process can be increased, and liquid leakage is avoided in the brewing process.

BRIEF DESCRIPTION OF THE DRAWINGS

In order to describe the embodiments of the present invention or the technical solution in the prior art more clearly, brief introduction on drawings needed to be used in the embodiment or description in the prior art will be made below. It is obvious that the drawings described below are merely some embodiments of the present invention, and those skilled in the technical field further can obtain other drawings according to the provided drawings without creative efforts.

DESCRIPTION OF THE EMBODIMENTS

Clear and intact description will be made on technical solution in the embodiment of the present invention below in combination with drawings in the embodiment of the present invention. The described embodiments are merely a part of embodiments of the present invention and are not all the embodiments. On a basis of the embodiments in the present invention, all other embodiments obtained by those skilled in the technical field without creative efforts fall into the scope of protection of the present invention.

It is a core of the present invention to provide a brewing cavity. When the brewing cavity is used for brewing coffee, a relatively large pressure can be formed in the brewing cavity, and the sealing property of the brewing cavity is better, such that liquid leakage is avoided when the coffee is brewed.

It is thereof another core of the present invention to provide a coffee brewer including the brewing cavity.

Figure 1:
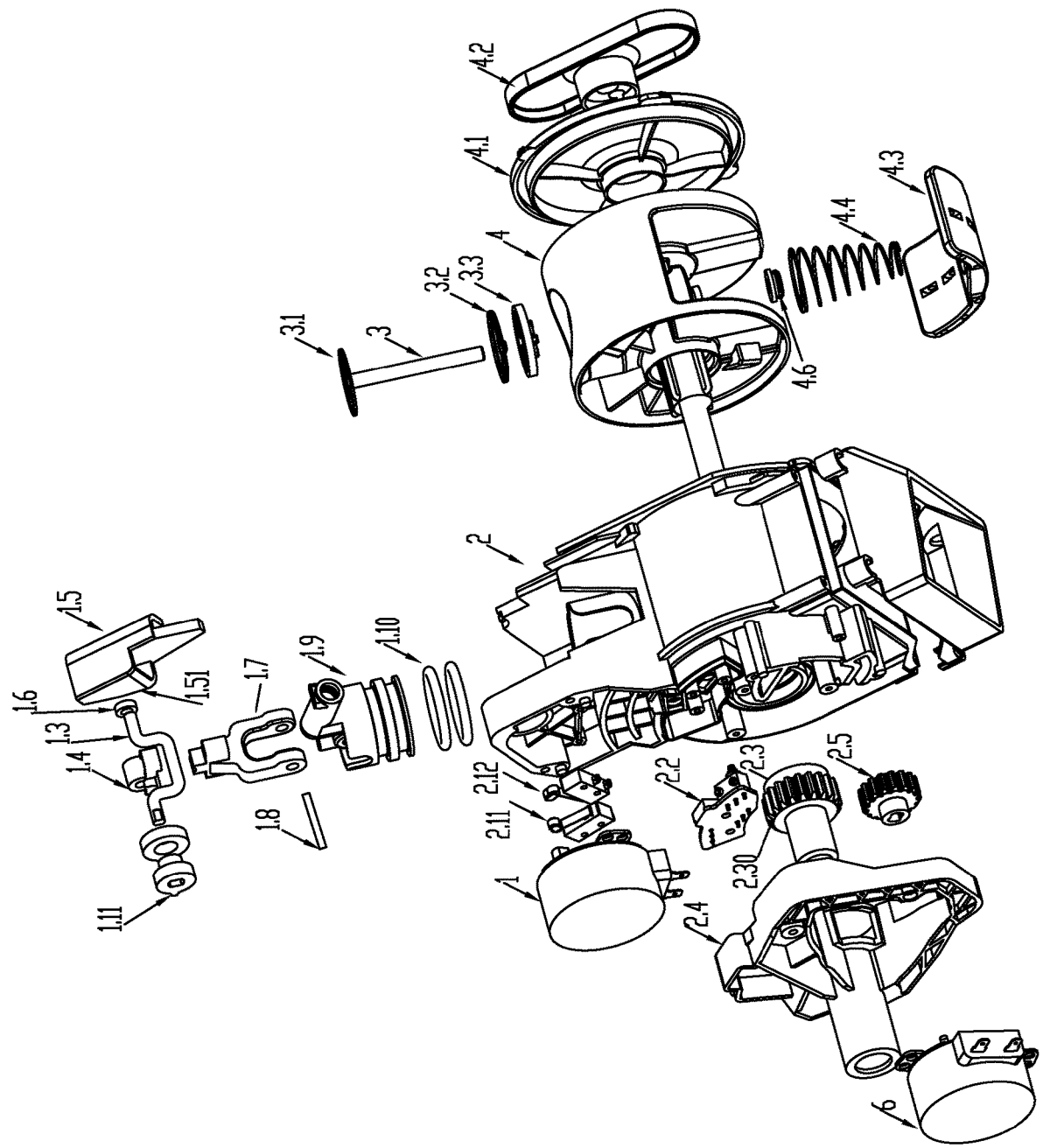
FIG. 1 is a three-dimensional exploded view of a coffee brewer provided by the present invention.
Figure 2:
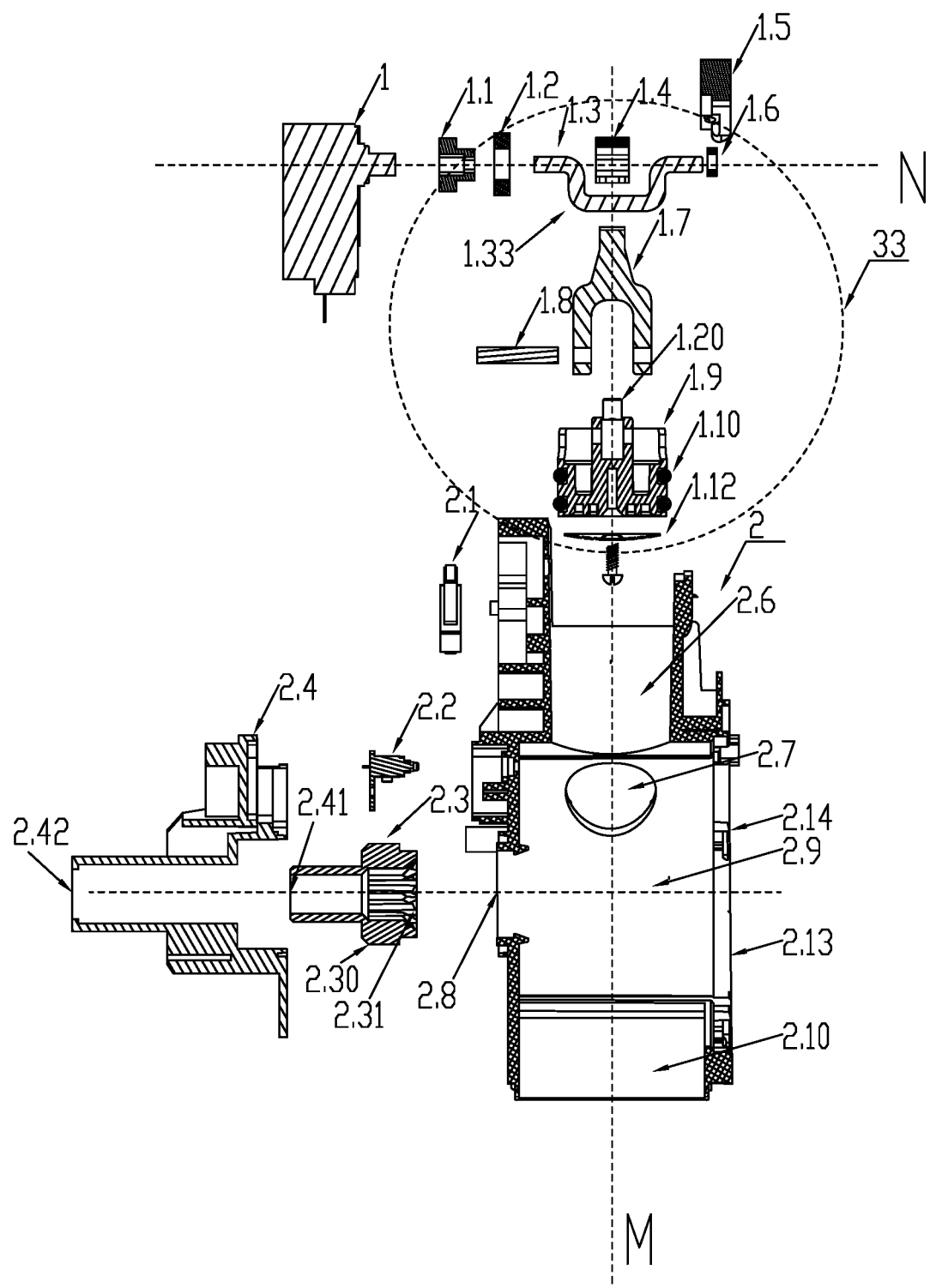
FIG. 2 is a structural schematic view of a brewing head and a brewing bracket provided by the present invention.
Figure 3:
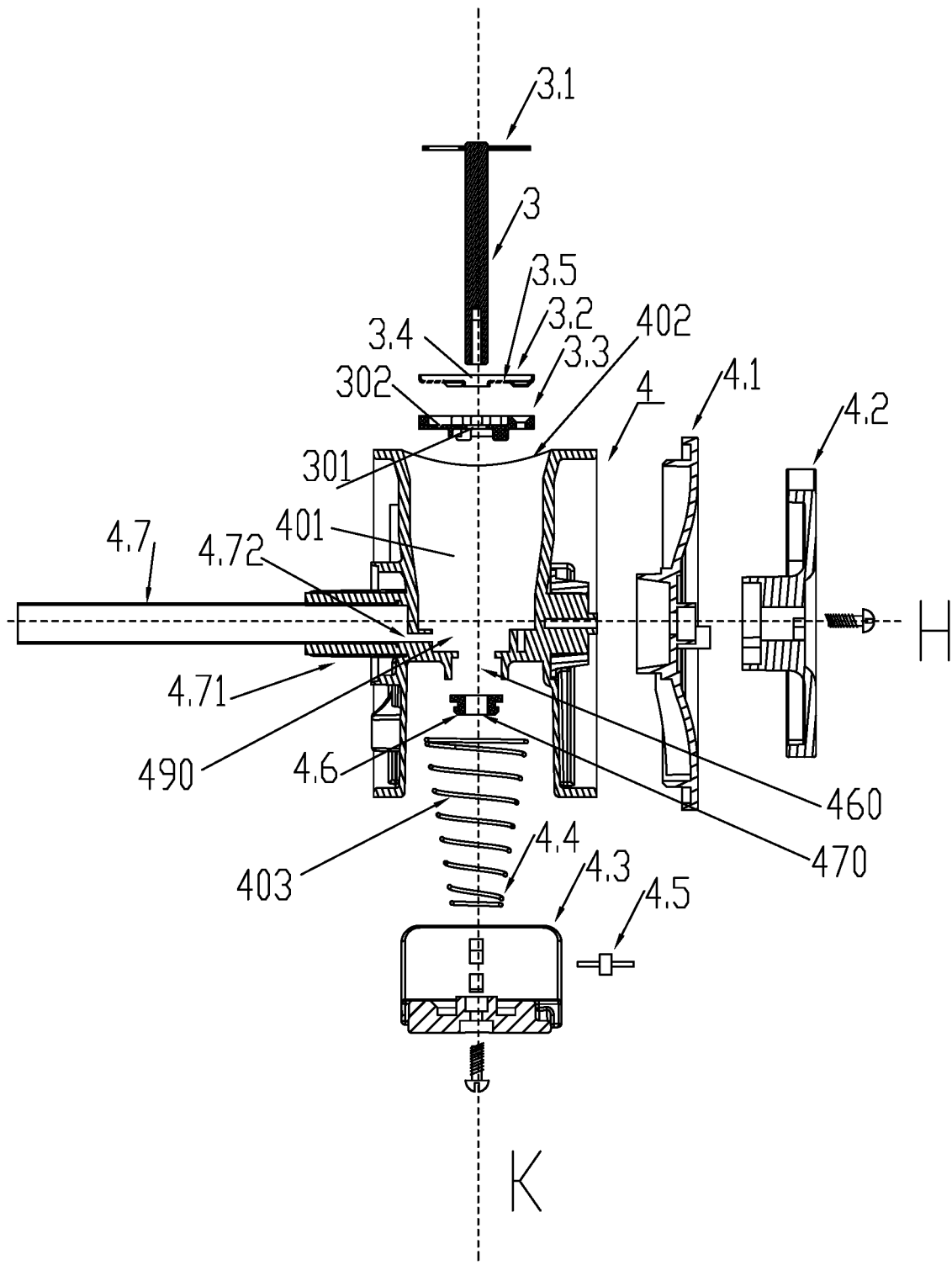
FIG. 3 is a structural schematic view of a brewing assembly provided by the present invention.
Figure 4:
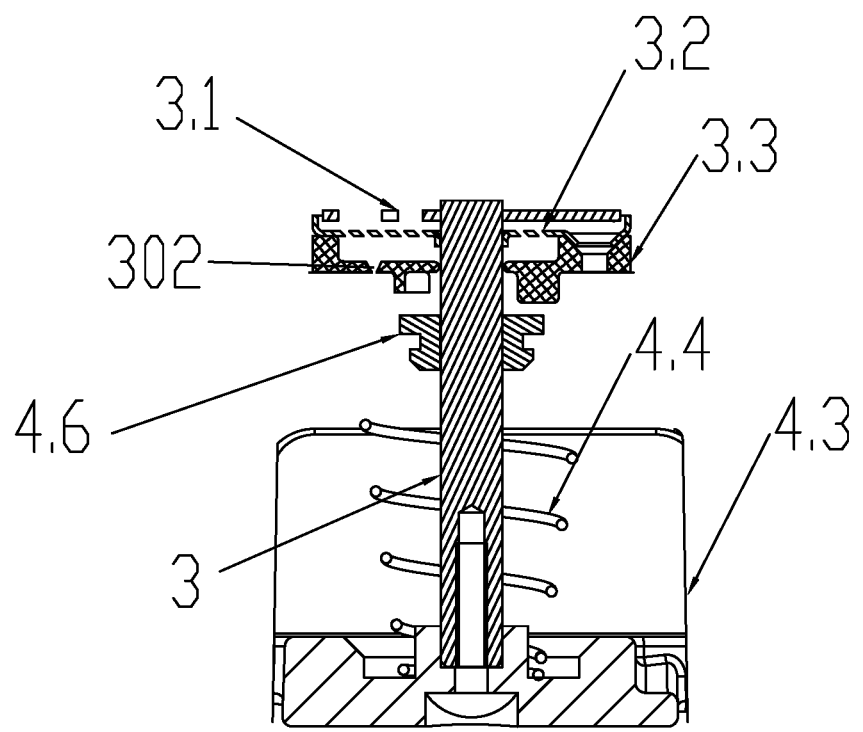
FIG. 4 is a structural schematic view of a grounds discharging portion provided by the present invention.
Figure 5:
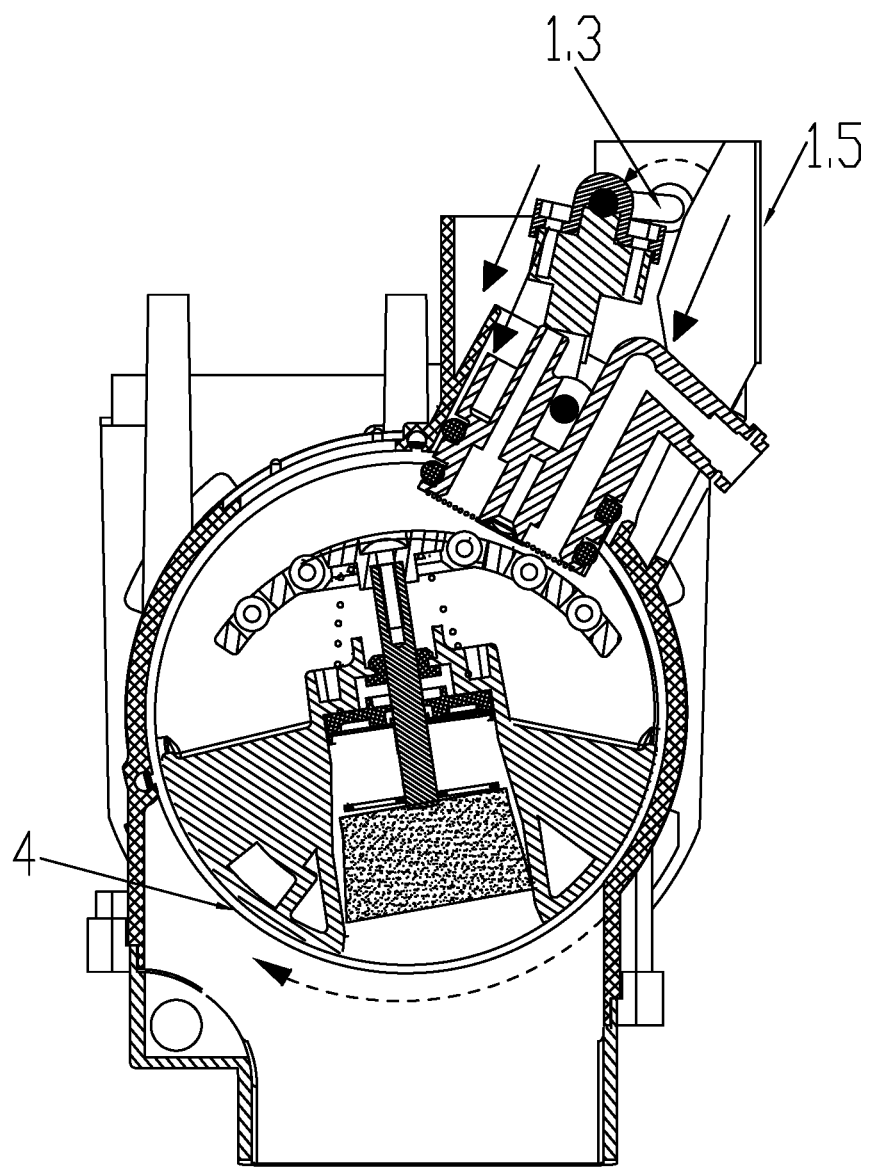
FIG. 5 is a structural schematic view of a brewing chamber provided by the present invention during rotation.
Figure 6:
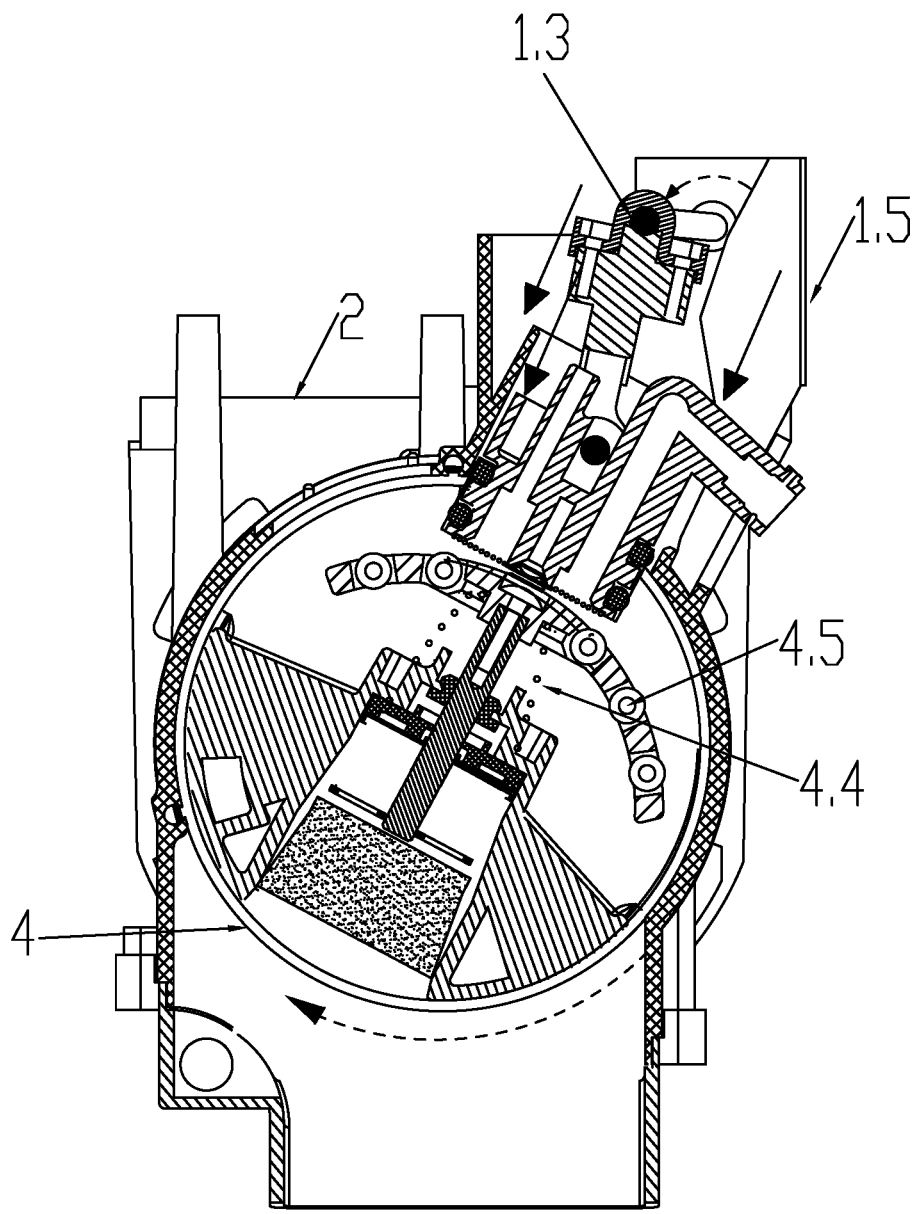
FIG. 6 is a structural schematic view of the brewing head provided by the present invention during the brewing head pushes downward to discharge grounds.
Figure 7:
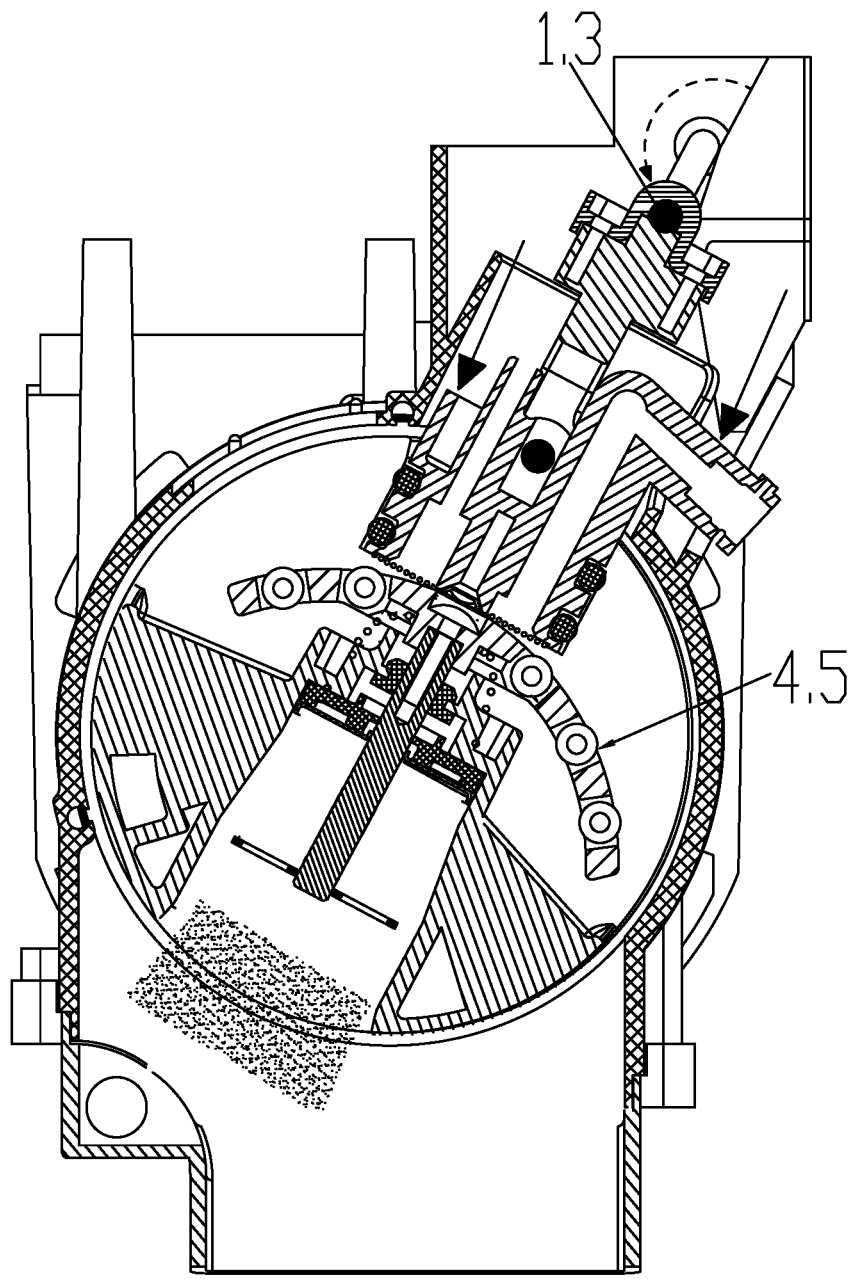
FIG. 7 is a structural schematic view of the brewing head provided by the present invention after the brewing head pushes downward to discharge grounds.
Figure 8:
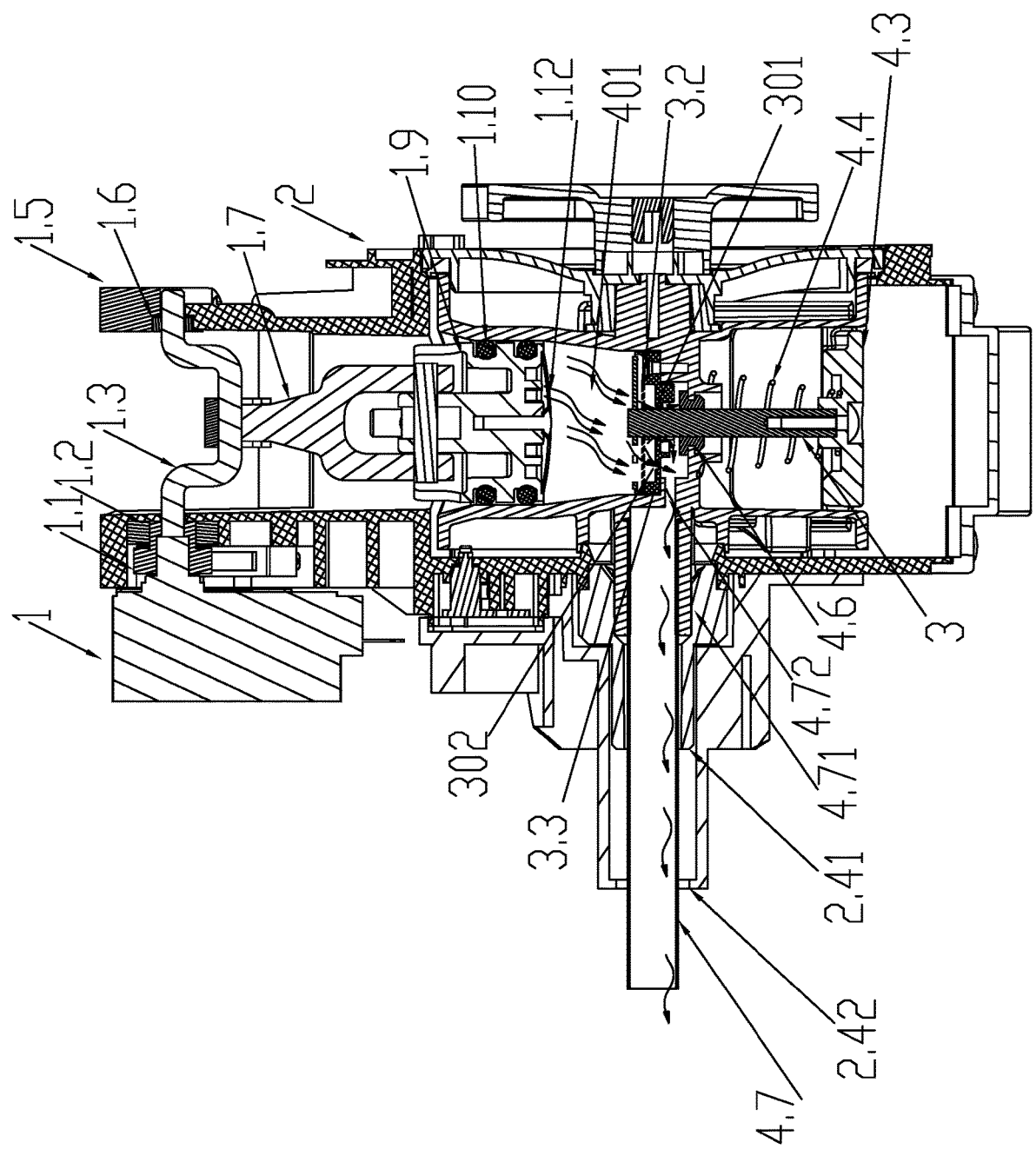
FIG. 8 is a front view of the brewing head provided by the present invention after the brewing head pushes downward for brewing.
Figure 9:
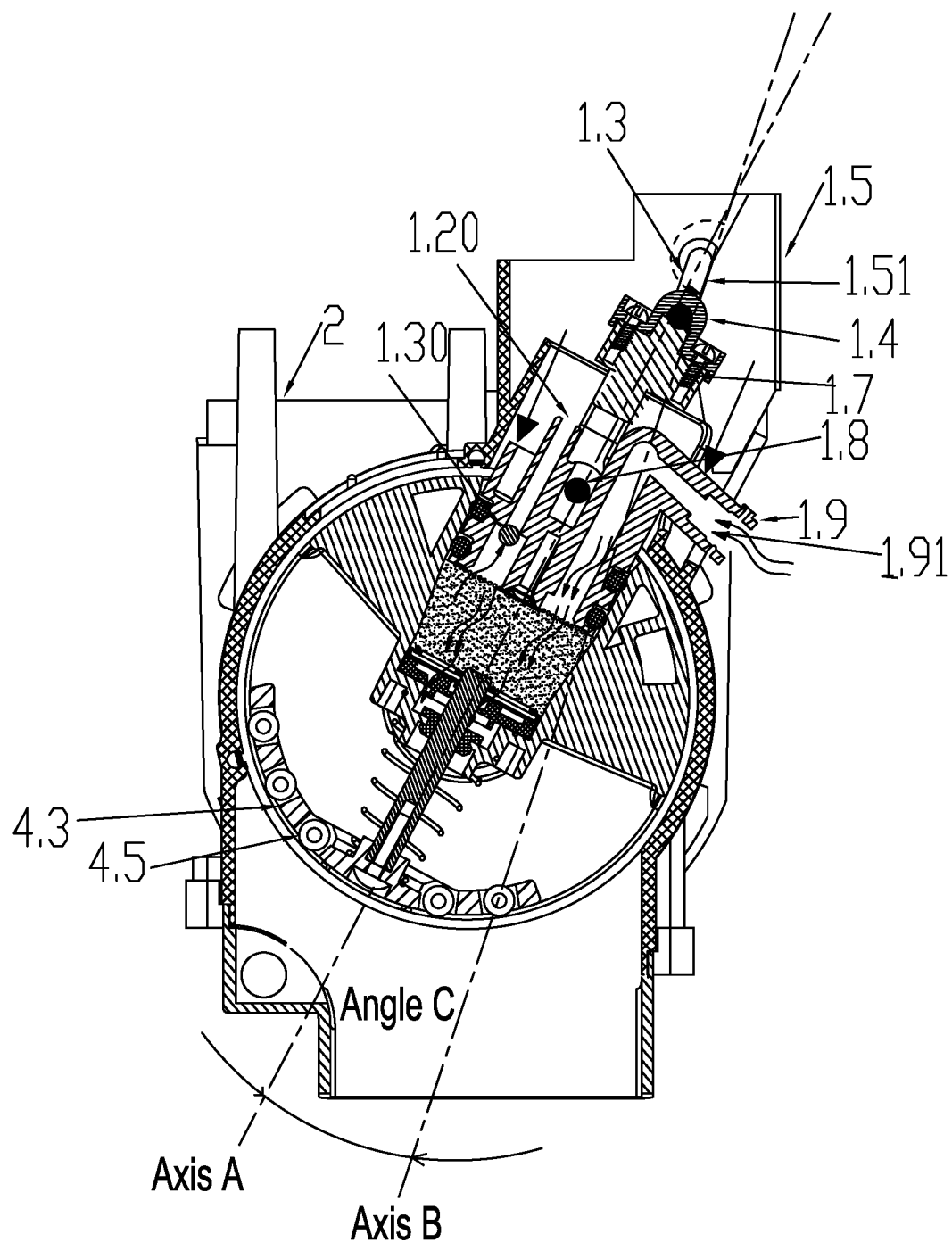
FIG. 9 is a side view of the brewing head provided by the present invention after the brewing head pushes downward for brewing.
Figure 10:
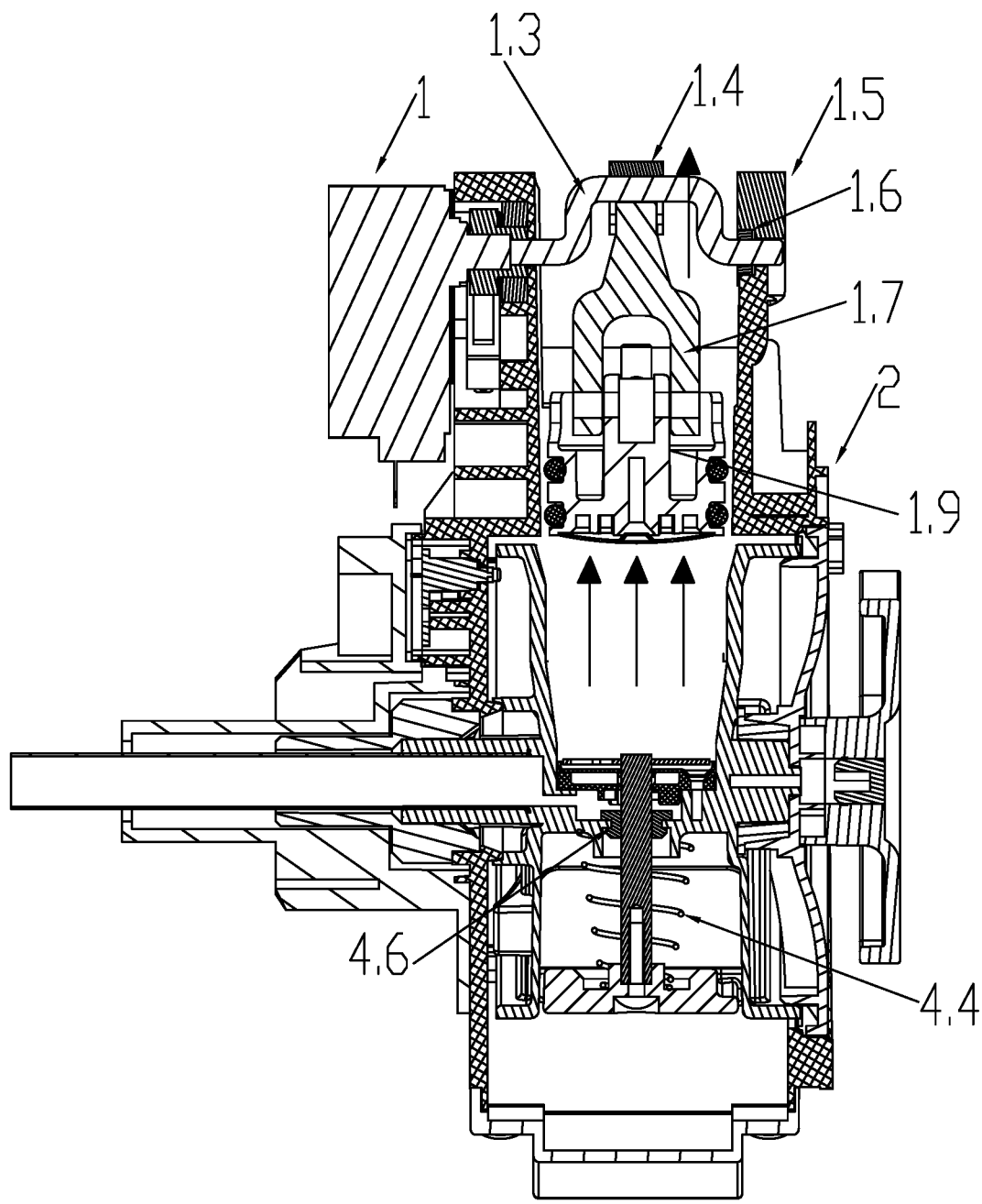
FIG. 10 is a front view of the brewing head provided by the present invention during upward movement.
Figure 11:
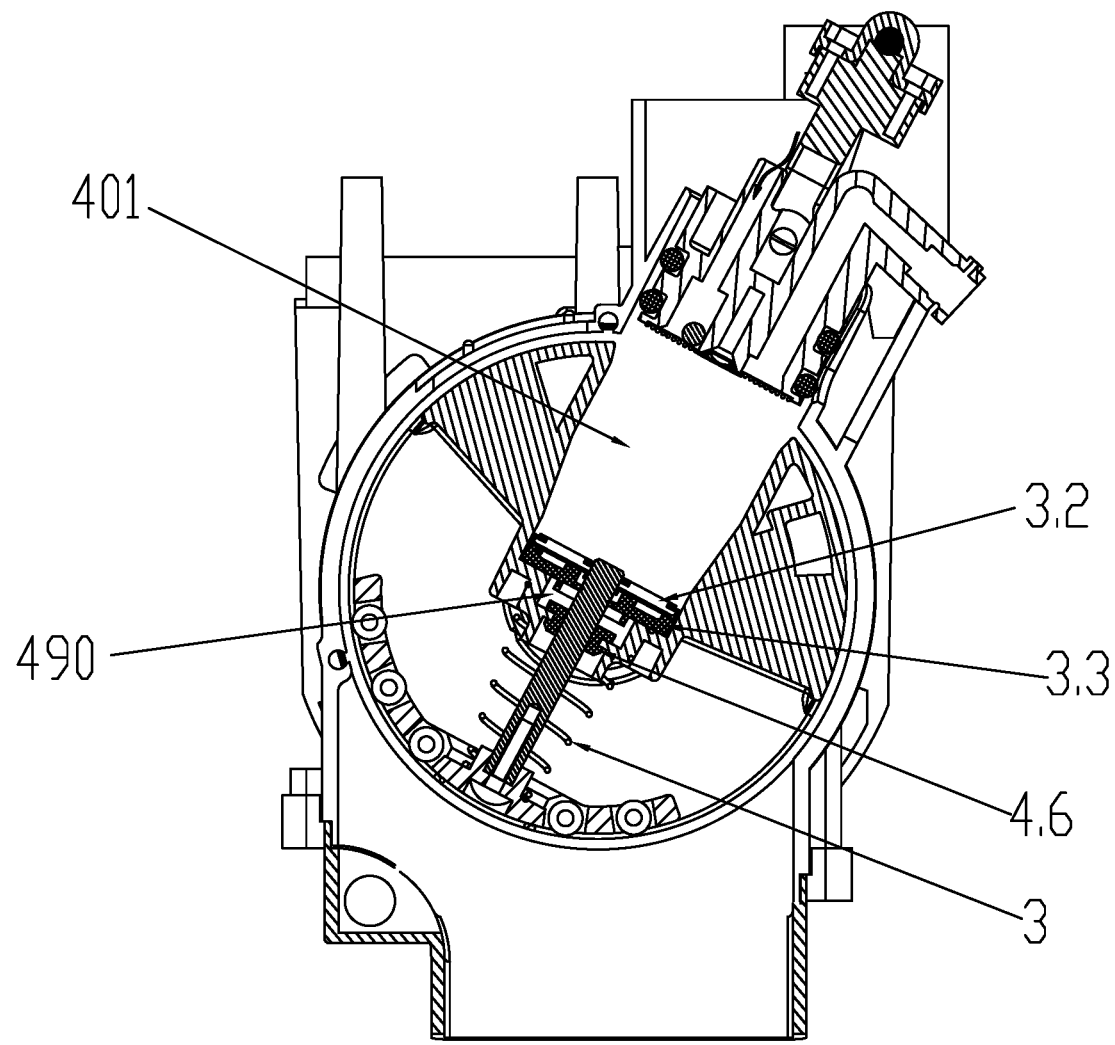
FIG. 11 is a side view of a brewing cavity provided by the present invention.
Figure 12:
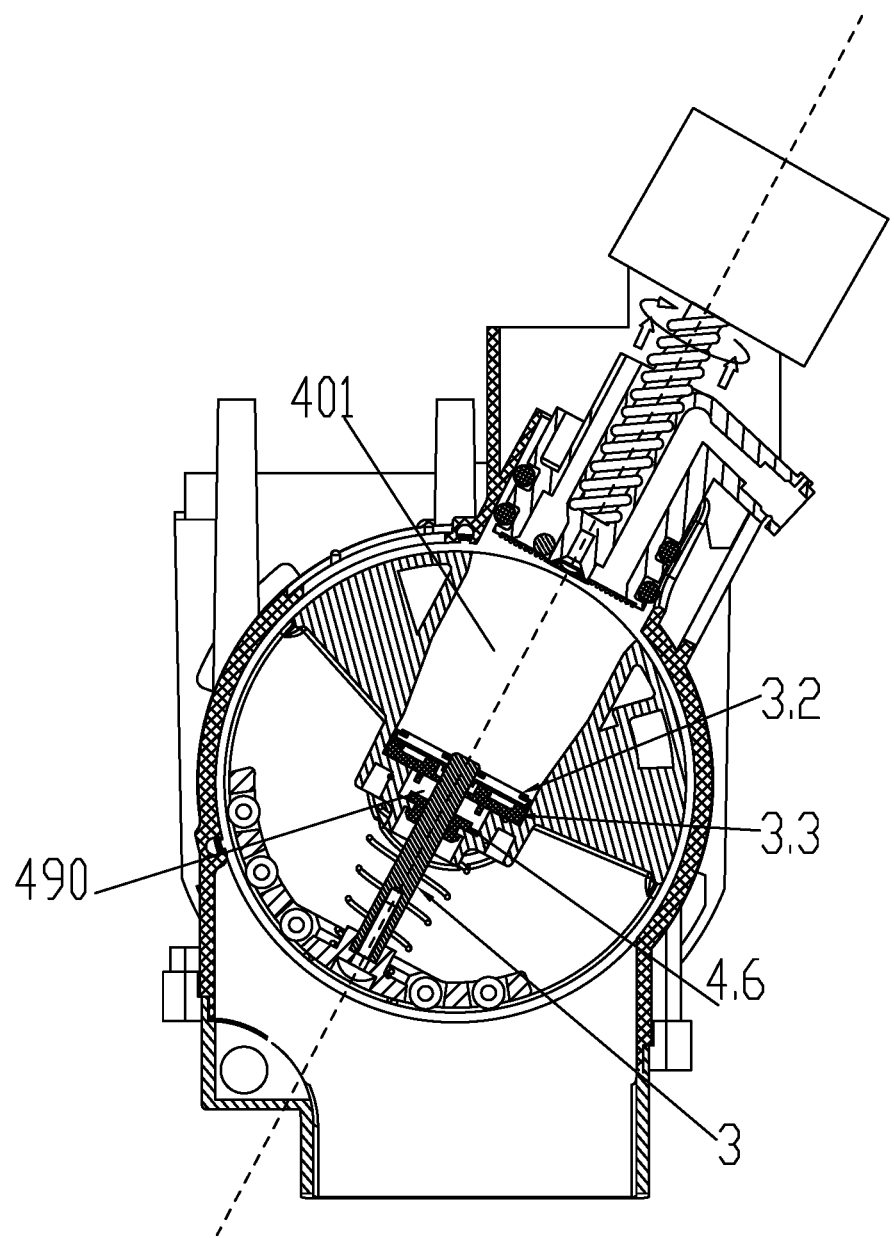
FIG. 12 is a section view of a first motor provided by the present invention driving the brewing head to move upwards via screw rods.
Figure 13:
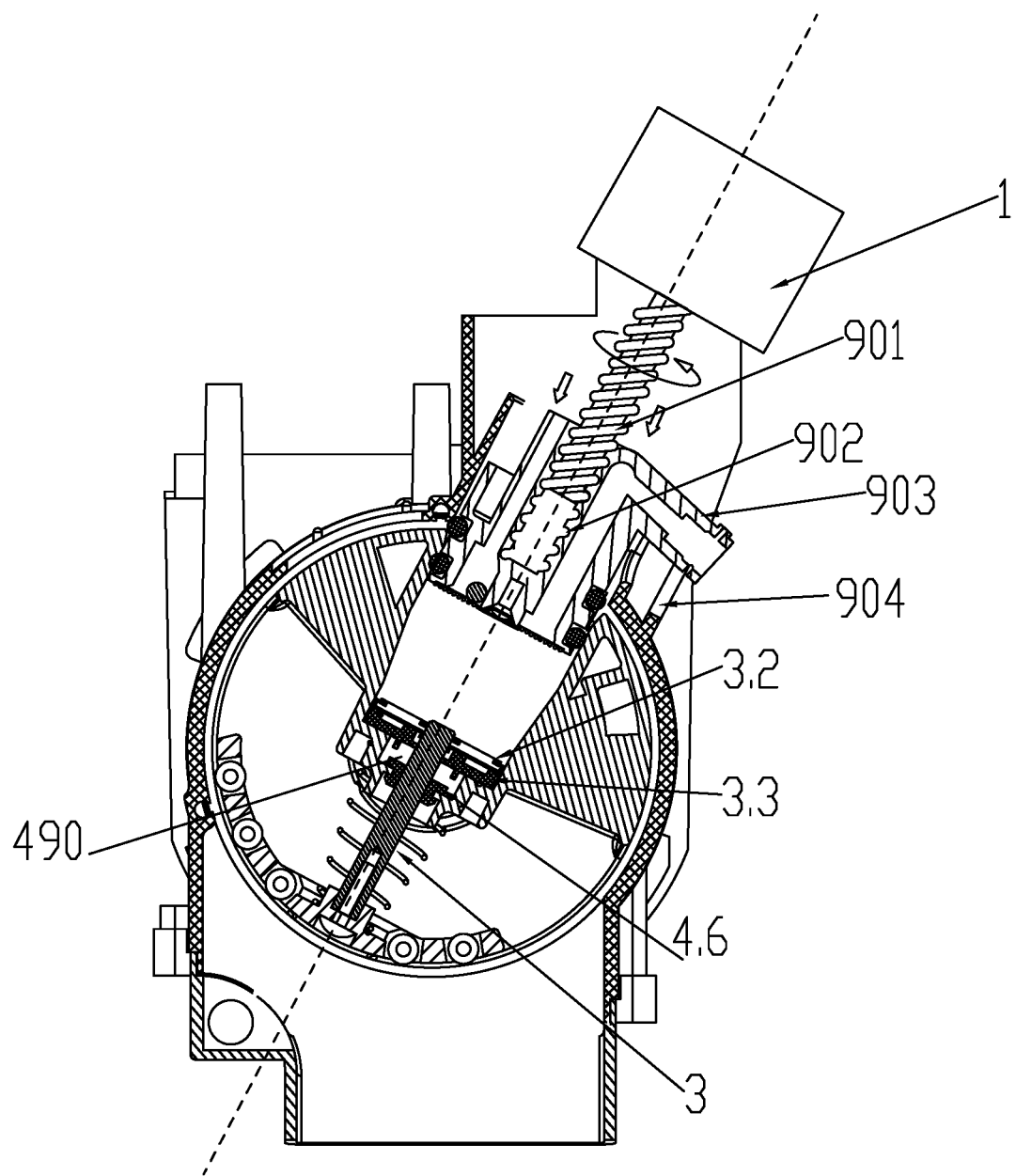
FIG. 13 is a section view of the first motor provided by the present invention driving the brewing head to move downwards via screw rods.

Referring to the FIG. 1 to FIG. 13, FIG. 1 is a three-dimensional exploded view of the coffee brewer provided by the present invention; FIG. 2 is a structural schematic view of the brewing head and the brewing bracket provided by the present invention; FIG. 3 is a structural schematic view of the brewing assembly provided by the present invention; FIG. 4 is a structural schematic view of the grounds discharging portion provided by the present invention; FIG. 5 is a structural schematic view of the brewing chamber provided by the present invention during rotation; FIG. 6 is a structural schematic view of the brewing head provided by the present invention during the brewing head pushes downward to discharge grounds; FIG. 7 is a structural schematic view of the brewing head provided by the present invention after the brewing head pushes downward to discharge grounds; FIG. 8 is a front view of the brewing head provided by the present invention after the brewing head pushes downward for brewing; FIG. 9 is a side view of the brewing head provided by the present invention after pushing brewing; FIG. 10 is a front view of the brewing head provided by the present invention during upward movement; FIG. 11 is a side view of the brewing cavity provided by the present invention; FIG. 12 is a section view of the first motor provided by the present invention driving the brewing head to move upwards via screw rods; FIG. 13 is a section view of the first motor provided by the present invention driving the brewing head to move downwards via screw rods.

The brewing cavity provided by the present invention includes the brewing cavity shell 4 rotatably arranged below the brewing assembly. The brewing cavity shell 4 is internally provided with the brewing chamber 401 for brewing coffee. The brewing cavity shell 4 is provided with a brewing cavity opening 402 that allows the brewing assembly to enter the brewing chamber 401 to compact coffee powder in the brewing chamber 401 and create a brewing pressure for the coffee. A bottom portion of the brewing chamber 401 is provided with a groove 490 with an inner diameter less than an inner diameter of the brewing chamber 401, the side wall of the groove 490 is provided with the coffee outlet 4.72, and the coffee outlet 4.72 is communicatively connected with the exterior.

The bottom portion of the groove 490 is provided with the through hole 460 with the axis consistent with the axis of the brewing chamber 401. The inner wall of the through hole 460 is provided with the coffee seal ring 4.6. The upper end surface of the groove 490 is fixedly provided with the pressure sealing water outlet element 3.3. The pressure sealing water outlet element 3.3 is provided with the coffee outlet hole 302 communicated with the coffee outlet 4.72, and the filtering portion 3.2 for filtering coffee is arranged above the pressure sealing water outlet element 3.3.

The filtering portion 3.2 is provided with the first sliding hole 3.4. The pressure sealing water outlet element 3.3 is provided with the second sealing sliding hole 301. The coffee seal ring 4.6 is provided with the third sealing sliding hole 470. The first sliding hole 3.4, the second sealing sliding hole 301 and the third sealing sliding hole 470 are internally provided with a discharge portion capable of sliding along the through hole 460 axially. The discharge portion is at least sealedly and slidably connected to the third sealing sliding hole 470.

The discharge portion can slide up and down in the first sliding hole 3.4, the second sealing sliding hole 301 and the third sealing sliding hole 470, to finish operation of compacting the coffee powder, discharging the coffee grounds and the like. The discharge portion is at least sealedly and slidably connected to the third sealing sliding hole 470. Through sealing connection, leakage of the coffee powder or the coffee liquid can be avoided, and meanwhile, the first sliding hole 3.4, the second sealing sliding hole 301 and the third sealing sliding hole 470 can be provided in a same longitudinal axis, such that it is convenient for the discharge portion to slide, thereby guaranteeing the stability of the discharge portion during sliding without deviation. The coffee liquid can flow to the exterior via the coffee outlet 4.72 communicatively connected with the exterior for a user to drink.

The brewing cavity 401 is used for brewing coffee. When coffee is brewed, the brewing assembly enters the brewing chamber 401 along the brewing cavity opening 402 to compact the coffee powder in the brewing chamber 401 and create a brewing pressure for the coffee so as to complete the brewing of the coffee. In the brewing process, the pressure in the brewing chamber 401 will be increased, and the brewed coffee will be discharged downwards via the coffee outlet 302 in the pressure sealing element 3.3 along the filtering portion 3.2.

The bottom portion of the brewing cavity shell 4 provided by the present invention is provided with the groove 490. The bottom portion of the groove 490 is provided with the through hole 460. The through hole 460 is internally provided with the coffee seal ring 4.6. The discharge portion capable of sliding axially along the through hole 460 is sealedly and slidably connected to the coffee seal ring 4.6. The through hole 460 and the brewing chamber 401 are consistent in axis, and the discharge portion can move along the axis of the brewing chamber 401, such that the discharge portion can discharge residual coffee grounds in the brewing chamber 401 after brewing coffee, thereby preparing for next time of coffee brewing.

The brewing cavity opening 402 is provided in the upper portion of the brewing cavity shell 4. As the brewing cavity shell 4 is rotatable, when it is needed to brew coffee, the brewing cavity shell is rotated until the brewing cavity opening 402 is aligned with the brewing assembly to brew coffee, and after the coffee is brewed, the brewing cavity shell is rotated until the discharge portion is aligned with the brewing assembly, and the brewing assembly pushes the discharge portion to discharge the coffee grounds.

The first sliding hole 3.4, the second sealing sliding hole 301 and the third sealing sliding hole 470 are internally provided with the discharge portion capable of sliding axially along the through hole 460, and the discharge portion penetrate through the first sliding hole 3.4, the second sealing sliding hole 301 and the third sealing sliding hole 470 simultaneously. When coffee is brewed, only the coffee outlet hole 302 is communicated with the coffee outlet 4.72 in the brewing chamber 401, and the coffee outlet 4.72 is communicated with outer side. When the discharge portion is sealedly and slidably connected to the third sealing sliding hole 470, the through hole 460 in the bottom portion of the groove 490 is blocked to prevent liquid leakage when the coffee is brewed. In addition, as the pressure sealing water outlet element 3.3 is fixedly arranged on the upper end surface of the groove 490 and does not move along with movement of the discharge portion, and wear of the pressure sealing water outlet element 3.3 is prevented, thereby increasing the internal pressure in the brewing chamber 401 when the coffee is brewed.

Based on the above specific embodiment, the inner wall of the through hole 460 is provided with the sealing element fixing position protruding radially inwards. The coffee seal ring 4.6 is the I-shaped seal ring, and the I-shaped seal ring is clamped on the top surface and the bottom surface of the sealing element fixing position. It should be noted that the second sealing element fixing position is annular and extends inwards along the radial direction of the inner wall of the through hole 460 to form the fixed ring. The I-shaped seal ring includes a top surface ring, a bottom surface ring and a middle cylinder connected to the top surface ring and the bottom surface ring. The top surface ring and the bottom surface ring are consistent in inner diameter, and the inner diameter of the top surface ring and the inner diameter of the bottom surface ring are consistent with the diameter of the middle cylinder. A middle through hole of the middle cylinder is the third sealing sliding hole 470. The top surface ring is provided in the upper end surface of the middle cylinder, and the bottom surface ring is arranged on the bottom surface of the middle cylinder and is I-shaped on a lateral surface. The outer diameter of the middle cylinder is matched with the inner diameter of the second sealing element fixing position. After the middle cylinder is mounted in the second sealing element fixing position, the top surface ring is attached to the top surface of the sealing element fixing position, and the bottom surface ring is attached to the bottom surface of the sealing element fixing position. The I-shaped seal ring provided by the embodiment is better in sealing property, such that coffee is further prevented from leaking from the through hole 460.

Based on the specific embodiment, the discharge portion comprises the discharge push rod 3 and the discharge element arranged at the upper end of the discharge push rod 3, and the discharge push rod 3 is at least sealedly and slidably connected to the third sealing sliding hole 470. It should be noted that, the discharge element may be a discharge plate 3.1 or a bracket or a spiral rack, and the discharge plate 3.1 may be a pore plate with a through hole in the surface of the plate, and a preset distance may be arranged between the discharge element and the inner wall of the brewing chamber 401 to prevent the discharge element from rubbing with the inner wall of the brewing chamber 401 during discharging. The discharge element is attached to the upper portion of the filtering portion 3.2 to place the coffee grounds.

Based on the specific embodiment, the filtering portion 3.2 is the metal filter screen or the plastic filter screen, and the pressure sealing water outlet element 3.3 is the silica gel element or the rubber element, and the coffee seal ring 4.6 is the silica gel element or the rubber element. It should be noted that, as it is unnecessary to guarantee the sealing for the first sliding hole 3.4, the metal element which is larger in hardness and longer in service life can be adopted or the plastic element which is lower in cost and smaller in weight can be adopted. As it is necessary to seal the second sealing sliding hole 301 and the third sealing sliding hole 470, it is necessary to select the silica gel element or the rubber element with certain elasticity. Further, the pressure sealing water outlet element 3.3 can be made from the silica gel or rubber material, such that the pressure sealing water outlet element is better in sealing property, stable in property and unlikely to be corroded.

Based on the specific embodiment, the coffee outlet hole 302 is provided in one side of the second sealing sliding hole 301, or the coffee outlet hole 302 is provided in the second sealing sliding hole 301. It should be noted that when the coffee outlet hole 302 is provided in one side of the second sealing sliding hole 301, the pressure sealing water outlet element 3.3 is provided with two holes, and the second sealing sliding hole 301 is an axle hole being machined along the axial direction of the pressure sealing water outlet element 3.3, and the coffee outlet hole 302 is provided in other parts of the pressure sealing water outlet element 3.3 and is not superposed with the second sealing sliding hole 301. When the coffee outlet hole 302 is provided in the second sealing sliding hole 301, the coffee outlet hole 302 and the second sealing sliding hole 301 both are provided in the axial direction of the pressure sealing water outlet element 3.3, and the two holes are superposed.

The present invention further provides a coffee brewer including the shell internally provided with the brewing cavity of any one of the above embodiments. After the shell is internally provided with the brewing cavity of any one of the above embodiment, the sealing property of brewing coffee can be improved, and the liquid leakage phenomenon generated when the coffee is brewed is prevented.

As a ground discharge structure of a coffee powder extrusion system in the prior art is too complex and is not suitably applied to a common coffee brewer, the price of the coffee brewer is high, such that promotion and use are not facilitated. In addition, in other types of coffee brewers, the coffee grounds are further discharged by additionally arranging a coffee plate hanging apparatus or a water spraying apparatus, and similarly, the coffee brewer is complex in structure and high in cost.

On account of the defects, based on the embodiment, further preferably, the brewing assembly includes the brewing head 1.9 movably arranged in the shell in an up-down direction, and the brewing cavity shell 4 is rotatably arranged below the brewing head 1.9 and a top portion of the brewing cavity shell 4 is provided with a diameter of the brewing cavity opening 402 matched with a diameter of the brewing head 1.9. The bottom portion of the brewing cavity shell 4 is provided with a discharge portion that is in tightly contact with the side wall of the brewing cavity shell 4 and can move along the brewing cavity shell 4. The brewing head 1.9 is connected with the first power portion for driving the brewing head 1.9 to move, and the brewing cavity shell 4 is connected with the second power portion for driving the brewing cavity shell 4 to rotate. When coffee is brewed, the second power portion drives the brewing cavity shell to rotate, such that the brewing cavity opening 402 is opposite to the brewing head 1.9, and the brewing head 1.9 is driven by the first powder portion to move downwards to extend into the brewing cavity shell 4 to compact coffee powder in the brewing cavity shell 4 and generate a brewing pressure to the coffee. When coffee grounds are discharged, the second power portion drives the brewing cavity shell 4 to rotate reversely, such that the discharge portions are opposite to the brewing head 1.9, and the brewing head 1.9 is driven by the first power portion to move downwards to push the discharge portion to move downwards, such that the discharge portions push the coffee grounds in the brewing chamber 4 to be discharged from the brewing cavity opening 402.

According to the shell, i.e., the carrier for fixing parts of the coffee brewer such as the brewing head 1.9 and the brewing cavity shell 4, the specific shape and dimension are selected according to dimensions of parts needed to be mounted. The brewing head 1.9 can be driven by the first power portion to move up and down. The brewing head and the first power portion may be directly connected to each other via parts such as a bolt and so on or may be indirectly connected to each other parts such as a curved bar, as long as it is an arrangement mode which realizes that the brewing head 1.9 moves up and down. As the brewing head 1.9 needs to extend into the brewing cavity opening 402 to compact the coffee in the brewing cavity shell 4, the brewing head 1.9 is usually a cylindrical brewing head matched with the brewing cavity opening 402 in diameter and can be manufactured by a plastic and the like.

It should be noted that the brewing cavity shell 4 can rotate under drive of the second power portion. Specifically, the brewing cavity shell 4 can overturn up and down, i.e., the brewing cavity opening 402 in the top portion of the brewing cavity shell 4 can be rotated from the upper side to the lower side, and the discharge portion arranged at the bottom portion of the brewing cavity shell 4 can be rotated from the lower side to the upper side. Thus, with respect to the object of the arrangement, it is convenient for the brewing head 1.9 to push the discharge portion to discharge the coffee grounds in the brewing cavity shell 4 directly.

The coffee brewer provided by the invention is provided with the brewing head 1.96 capable of being driven by the first power portion to move up and down and the rotatable brewing cavity shell 4. The diameter of the brewing head 1.9 is matched with that of the brewing cavity opening 402 of the brewing cavity shell 4, and the brewing head can extend into the brewing cavity opening 402 and is in tight contact with the side wall of the brewing cavity shell 4 to create a brewing pressure for the coffee in the brewing cavity shell 4, such that the coffee powder and the hot water are fully mixed, and meanwhile, after the coffee is brewed, a part of coffee grounds will be left in the brewing cavity shell 4. At the moment, it is only needed to drive the brewing cavity shell 4 to rotate reversely by the second power portion to rotate the discharge portion at the bottom portion of the brewing cavity shell 4 from the lower side of the shell to the upper side in a position opposite to the brewing head 1.9. As the discharge portion is in tight contact with the side wall of the brewing cavity shell 4, i.e., the discharge portion can be taken as a bottom plate of the brewing cavity shell 4, it is not needed to arrange a bottom plate additionally, such that the cost is lowered. The discharge portion can move along the brewing cavity shell 4, and the brewing head 1.9 moves downwards to press the discharge portion, and the discharge portion pushes the coffee grounds left on positions such as the side wall of the brewing cavity shell 4 downwards to discharge the coffee grounds from the brewing cavity opening 402 located below the shell at the moment.

According to the coffee brewer provided by the present invention, by arranging the brewing head 1.9 and the rotatable brewing cavity shell 4 provided with the discharge portion at the bottom, sealed brewing and ground discharging operations of coffee are realized at the same time, and it is only needed to rotate the brewing cavity shell to switch the sealed brewing and ground discharging operations. The coffee brewer is easy and convenient to operate, simple in integral structure and low in production cost, and it is not needed to arrange other ground discharge parts additionally.

Discharge portion includes the discharge push rod 3 and the discharge element arranged at the upper end of the discharge push rod 3. The lower portion of the discharge push rod 3 is fixedly connected to the pressure plate 4.3. The pressure plate 4.3 is connected to the outer wall of the brewing cavity shell 4 via an elastic element. One end of the elastic element abuts against the lower end surface of the through hole 460 while another end of the elastic element abuts against the pressure plate 4.3. The discharge element is attached to the upper portion of the filtering portion 3.2 via the elastic element. The brewing head 1.9 pushes the pressure plate 4.3 downwards to drive the discharge element to move downwards to discharge the coffee grounds, and the elastic element is used for driving the pressure plate 4.3 to be restored to an original position after discharging the coffee grounds.

It should be noted that the discharge portion includes the discharge push rod 3 and the discharge element arranged on the top portion of the discharge push rod 3 and matched with the brewing cavity shell 4 in diameter, and the bottom portion of the discharge push rod 3 is connected to the pressure plate 4.3 which is used for contacting with the brewing head 1.9, and the brewing head 1.9 pushes the pressure plate 4.3 downwards to drive the discharge element to move downwards to discharge the coffee grounds.

It can be understand that as a part of coffee grounds may be left on the side wall of the brewing cavity shell 4, the discharge element is thus arranged to be matched with the brewing cavity shell 4 in diameter, generally a round plastic plate. When the discharge element moves downwards, the coffee grounds on the side wall of the brewing cavity shell 4 can be scraped to be driven to be discharged downwards via the brewing cavity opening 402, and the bottom portion of the discharge push rod 3 is connected to the pressure plate 4.3, and the pressure plate 4.3 is larger than the discharge push rod 3 in area. It is an object of arranging the pressure plate 4.3 to improve the contact area between the brewing head 1.9 and the discharge portion, guaranteeing that the brewing head 1.9 can push the discharge portion to move smoothly. The discharge element can be further replaced in form of a discharge rack and the like. Certainly, the specific structure of the discharge portion is not limited to the above manner, and the user can arrange the specific structure flexibly according to an actual condition.

Specially, the brewing assembly includes the brewing cavity shell 4, the supporting cover 4.1, the handle 4.2 and the grounds discharging portion 55. The brewing assembly is at least provided with the brewing cavity shell 4 and the grounds discharging portion 55. The longitudinal axis k of the brewing cavity shell 4 is provided with the brewing chamber 401. The brewing chamber 401 is provided with the brewing cavity opening 402. The bottom portion of the brewing chamber 401 is provided with the through hole 460 and the lower portion of the brewing chamber is provided with the coffee outlet 4.72, and the liquid outlet pipe 4.7 is arranged outside the coffee outlet 4.72 in a penetrating manner. The bottom portion of the brewing cavity shell 4 is provided with the downward opened discharge port 2.10, and the first brewing head movement microswitch 2.11 and the second brewing head movement microswitch 2.12 for controlling the brewing head 1.9 to move up and down.

The elastic element is the reset spring 4.4, and the lower end of the discharge push rod 3 penetrates through the middle hole 403 of the reset spring 4.4 and is connected to the pressure plate 4.3. The reset spring 4.4 is a spiral spring, and the spring of such structure is relatively low in cost and convenient to disassemble.

In a specific embodiment with respect to the first power portion, the first power portion includes the first motor 1 and the convex driving curved bar 1.3 connected to the rotating shaft of the first motor 1, and the swing portion 1.33 on the top portion of the driving curved bar 1.3 is rotatably connected to the top portion of the brewing head 1.9 via the oscillating bar, such that the brewing head 1.9 moves along the linear channel 2.6 arranged in the shell.

The first motor 1 can be electric motors such as a direct current motor, an asynchronous motor and a synchronous motor frequently used in the prior art. The rotating shaft of the first motor 1 is connected to one end of the driving curved bar 1.3 via parts such as a bolt and so on. The swing portion 1.33 on the top portion of the curved bar 1.3 is a rod body with a convex top. The distance between the highest point and the lowest point when the swing portion 1.33 rotates is the distance that the brewing head 1.9 moves up and down. As the swing portion 1.33 has a transverses displacement when rotates, in order to ensure movement of the brewing head 1.9 to be a linear movement, the swing portion 1.33 is rotatably connected to the top portion of the brewing head 1.9 via the oscillating bar 1.7, and the oscillating bar 1.7 rotates together with the swing portion 1.33 without affecting movement of the brewing head 1.9 along the linear channel arranged in the shell.

Specifically, the first motor 1 is rotatably connected to the driving curved bar 1.3. Two ends of the driving curved bar 1.3 are respectively provided with the first bearing 1.2 and the second bearing 1.6 rotatably connected to the brewing bracket 2. The first motor 1 is connected to one end of the driving curved bar 1.3 via an adapter 1.1 to transmit and is provided with the microswitch driving position 1.11 to control the first motor 1. Another end of the driving curved bar 1.3 is fixedly connected to the brewing bracket 2 through the limiting block 1.5 in a positioned manner. A swing position in the middle of the driving curved bar 1.3 is rotatably connected to the oscillating bar 1.7. The driving curved bar 1.3 is rotatably connected to the upper portion of the oscillating bar 1.7 in a positioned manner by an upper oscillating bar element 1.4. The swing position of the driving curved bar 1.3 rotatably controls the oscillating bar 1.7 to move up and down, the oscillating bar 1.7 is rotatably connected to the brewing head 1.9 via the first rotating shaft 1.8, and the oscillating bar 1.7 drives the brewing head 1.9 to move up and down in the brewing chamber 401 and control the discharge push rod 3 to stretch to discharge the coffee grounds.

Alternately, as a second preferred solution, the rotating shaft of the first motor 1 and the top portion of the brewing head 1.9 are rotatably connected to each other to drive via the screw 901, such that the brewing head 1.9 moves along the linear channel 2.6 arranged in the shell. The brewing head is provided with the water inlet joint or the lug, and the brewing bracket 2 is provided with the sliding groove 904 that is consistent with the length direction of the screw 901 and is slidably matched with the water inlet joint 903 or the lug.

It should be noted that, the sliding groove 904 is provided in the outer side wall of the brewing bracket 2, and the opening direction of the sliding groove 904 is consistent with that of the brewing cavity opening 402. The water inlet joint 903 on the brewing head 1.9 or the lug is slidably arranged in the sliding groove 904 along the length direction of the sliding groove 904. When the screw 901 rotatably drives the brewing head 1.9 to move, the brewing head 1.9 is easy to rotate together with the screw 901, and the brewing head 1.9 is provided with the water inlet joint 903 or the lug to prevent the brewing head 1.9 from rotating in the brewing chamber 401, such that the brewing head 1.9 is driven by the screw 901 to move linearly only.

Two sides of the rotating shaft of the first motor 1 are provided with microswitch driving positions 1.11 to control left and right rotating angles of the rotating shaft of the first motor 1. The brewing head 1.9 is controlled to move up and down at a distance via the microswitch driving positions 1.11. Specifically, the brewing head 1.9 is provided with the screw hole 902 along the direction of the linear channel 2.6, and the bolt 901 is screwed into the screw hole 902. When the first motor 1 drives the bolt 901 to rotate, under interaction between the bolt 901 and the screw hole 902, the brewing head 1.9 will move along the linear channel 2.6.

The bottom portion of the brewing chamber 401 is provided with a feed opening 2.7. A longitudinal axis M is arranged perpendicularly or obliquely. A transverse axis H of the brewing bracket 2 is provided with a positioning rotating hole 2.8. The transverse axis H is arranged horizontally or obliquely. The grounds discharging portion 55 is at least provided with the discharge push rod 3. The discharge push rod 3 is provided with the discharge element, the filtering portion 3.2, the pressure sealing water outlet element 3.3, the coffee seal ring 4.6, the reset spring 4.4 and the pressure plate 4.3 from top to bottom in sequence. The grounds discharging portion 55 is arranged on two sides of the through hole 460 of the brewing chamber 401 of the brewing cavity shell 4. The discharge push rod 3 is slidably connected in the through hole 460 or the coffee seal ring 4.6. The discharge element on the discharge push rod 3 and the pressure plate 4.3 clamp and connect the filtering portion 3.2, the pressure sealing water outlet element 3.3, the coffee seal ring 4.6 and the reset spring 4.4. Or, the discharge element on the discharge push rod 3 and the pressure plate 4.3 clamp and connect the filtering portion 3.2, the pressure sealing water outlet element 3.3 and the reset spring 4.4. The discharge element is fixed to the upper portion of the discharge push rod 3, and the discharge push rod 3 passes through the first sliding hole 3.4 in the filtering portion 3.2, the second sealing sliding hole 301 in the pressure sealing water outlet element 3.3, the through hole 460 in the bottom portion of the brewing chamber 401 and the reset spring 4.4 in sequence and is fixedly connected to the pressure plate 4.3. The filtering portion 3.2 is arranged on the upper portion of the pressure sealing water outlet element 3.3. A screw is fixedly arranged on the lower portion of the brewing chamber 401 and is located at the coffee outlet 4.72 at the bottom portion of the brewing chamber 401 and the upper portion of the coffee seal ring 4.6. The filtering portion 3.2 is sealedly connected to the brewing chamber 401 via the side portion or the bottom portion of the pressure sealing water outlet element 3.3. The through hole 460 and the coffee seal ring 4.6 are integrally arranged or arranged in a split manner. A middle through hole passes through the discharge push rod 3, the outer tooth 4.71, the coffee outlet 4.72 and the liquid outlet pipe 4.7 are arranged on the transverse axis H and are rotatably connected to the brewing bracket 2. The supporting cover 4.1 is rotatably locked in the cavity 2.9 via the brewing assembly to rotate the liquid outlet pipe 4.7 of the brewing assembly to enter the first spigot 2.13, the second spigot 2.41 and the third spigot 2.42 in sequence to rotate and position. The brewing cavity shell 4 enters the inner side of the cavity 2.9. The supporting cover 4.1 is packaged in the first spigot 2.13, the supporting cover 4.1 is fixedly provided with the handle 4.2 to drive to be in locked connection with the buckling position 2.14 in a concentric locating manner, and the supporting cover 4.1 is fixedly and rotatably connected to the brewing cavity shell 4. The shell is provided with the brewing cavity positioning switch assembly 2.2 for positioning the brewing cavity shell 4.

Preferably, the filtering portion 3.2 is provided with the filtering hole 3.5, the first sliding hole 3.4 and the fixed position. The first sliding hole 3.4 is provided in the middle. The periphery of the first sliding hole 3.4 is provided with the filtering hole 3.5, and the periphery of the filtering hole 3.5 is provided with a turnup to prevent deformation. The pressure sealing water outlet element 3.3 is provided with the second sealing sliding hole 301 and the coffee outlet hole 302. The pressure sealing water outlet element 3.3 is at least provided with the coffee outlet hole 302, and the coffee outlet hole 302 is formed in a pinhole pressure-maintaining manner. The filtering portion 3.2 and the pressure sealing water outlet element 3.3 are adaptively and sealedly arranged in a fit manner. A gap is provided between the filtering portion 3.2 and the pressure sealing water outlet element 3.3 for the convenience of flow of a coffee liquid. A gap is provided between the coffee outlet hole 302 and the bottom portion of the brewing chamber 401 is formed for the convenience of flow of the coffee liquid, and the second sealing sliding hole 301 is slidably and sealedly connected to the discharge push rod 3 and is up-and-down slidable to the discharge push rod 3. The pressure plate 4.3 is arranged in a cambered manner and is arranged consistently with the cambered surface of the periphery of the transverse axis H of the brewing cavity shell 4. The pressure plate 4.3 is provided with the pressure plate rotating shaft 4.5. The reset spring 4.4 is arranged in a tower-shape, such that the compression spatial distance is reduced; the pressure plate 4.3 is provided with the pressure plate rotating shaft 4.5, such that the brewing head 1.9 can push out coffee grounds when the pressure plate 4.3 rotates, and the pressure plate rotating shaft 4.5 is rotatably connected to the brewing head 1.9, thereby reducing the friction force.

Preferably, the water inlet hole 1.91 is communicatively connected to the brewing chamber 401 via the dividing cap. The water inlet hole 1.91 is communicatively connected to the ventilation pipe 1.20. The lower portion of the brewing chamber 401 is provided with the coffee outlet 4.72 in a penetrating manner. The coffee outlet 4.72 penetrates the liquid outlet pipe 4.7, and the liquid outlet pipe 4.7 penetrates outside.

In order to guarantee that the brewing head 1.9 does not move when brewing coffee, in the specific embodiment, the shell is provided with the limiting block 1.5 for limiting rotation of the driving curved bar 1.3, and the limiting block 1.5 is arranged on the rotating track on one side of the driving curved bar 1.3 to prevent the brewing head 1.9 from moving upwards or swinging under the action of hot water in the brewing cavity shell 4 during water ingress.

There is only one limiting block 1.5 usually and the limiting block 1.5 is arranged on the rotating track on one side of the driving curved bar 1.3, such that it is ensured that when it is needed to move the brewing head 1.9 upwards, the driving curved bar 1.3 can rotate to the highest point toward the other side. Specifically, the up-down swing distance of the swing portion 1.33 of the driving curved bar 1.3 is an up-down moving distance of the brewing head 1.3, i.e., the brewing head moves downwards to compact coffee powder, such that resistance of a water flow barrier when the coffee powder is brewed is converted into a water pressure. The oscillating bar 1.7 is provided between the driving curved bar 1.3 and the brewing head 1.9 to control the brewing head 1.9 to move linearly in the linear channel 2.6 in a limited manner to reduce the swing distance and to be sleeved and positioned precisely with the brewing cavity opening 402. A lower rotating track of the swing portion 1.33 is provided with a curved bar stopping portion 1.51, and the curved bar stopping portion 1.51 is arranged on an axis B to stop the swing portion 1.33, such that the brewing chamber 401 generates a brewing pressure. The brewing pressure is at least greater than 10 barometric pressure or a pressure of 10 Pa. The axis B is arranged in a swing advancing direction of the driving curved bar 1.3 and passes through the center of the driving curved bar 1.3 to press the axis A downwards to form an included angle C, wherein the axis A is a concentric axis between the brewing head 1.9 and the driving curved bar 1.3. The axis B is a driving curved bar stopping axis. The angle C is an included angle between the axis A and the axis B. Inflow of the water inlet hole 1.91 is controlled to generate the water pressure without bounce to push the brewing head 109 to move upwards, such that it is ensured that the brewing head 1.9 is positioned and maintained constantly in pressure, and therefore, solving a problem that the center axis of the driving curved bar 1.3 does not pass the axis A (or on axis A) when the driving curved bar swings and that the driving curved bar is rebounded to push the brewing head 1.9 to move upwards, leading to a result that the brewing chamber 401 cannot be sealed. The stopping contact dimension of the curved bar stopping portion 1.51 is at least a half of the swing portion 1.33 in length or is consistent with the dimension as the center axis of the driving curved bar 1.3.

In order to guarantee that the limiting block 1.5 can play a stopping role, in the specific embodiment, the width of the curved bar stopping portion 1.51 contacted with the swing portion 1.33 on the limiting block 1.5 is at least a half of a width of the swing portion 1.33.

It can be understood that the greater the width of the curved bar stopping portion 1.51 on the limiting block 1.5 is, the larger the area between the curved bar stopping portion and the swing portion 1.33 is and the greater the stopping force received by the swing portion 1.33 is. Thus, it is ensured that the brewing head 1.9 is stably positioned without moving upwards under the action of the water pressure.

In order to reduce bubbles generated when the coffee is brewed and improve the drinking taste of the user, in the specific embodiment, the brewing head 1.9 is provided with the ventilation pipe 1.20 penetrating through the axial direction of the brewing head 1.9. A steam buoyancy valve 1.30 capable of floating along with hot water in the brewing cavity shell 4 is arranged below the ventilation pipe 1.20. When water vapor in the brewing cavity shell 4 is discharged from the ventilation pipe 1.20, the steam buoyancy valve 1.30 floats upwards along with the hot water in the brewing cavity shell 4 to block the ventilation pipe 1.20.

Specifically, the brewing head 1.9 moves downward to be movably and sealedly connected to the brewing chamber 401 via the seal ring 1.10. Water and water vapor enter the water inlet hole 1.91, a part of water vapor is discharged via the ventilation pipe, and after the water vapor is discharged, the hot water pushes the steam buoyancy valve 1.30 to move upwards to close the front end inlet of the ventilation pipe 1.20. The ventilation pipe 1.20 is characterized in exhausting gas and draining water. The hot water enters the brewing chamber 401 via the dividing cover to brew with the coffee powder. The coffee solution flows out along the coffee outlet hole 302 in the pressure sealing water outlet element 3.3.

The coffee seal ring 4.6 on the brewing cavity shell 4 is sealedly connected to the discharge push rod 3, and the coffee outlet 4.72 is a unique outlet of the coffee solution. The brewing head 1.9 moves upwards to relieve sealed connection with the brewing chamber 401 and the steam buoyancy valve 1.30 moves downwards to intake air, and the brewing head 1.9 does not generate a suction force negative pressure to move upwards to be separated from the brewing cavity opening 402.

On a basis of the specific embodiment, the pressure plate 4.3 is the arc-shaped pressure plate opened facing the direction of the discharge push rod 3, and the surface of the arc-shaped pressure plate is provided with several pressure plate rotating shafts 4.5 for contacting with the brewing head 1.9.

It can be understood that the pressure plate 4.3 is configured to the arc-shaped pressure plate for the following objectives. On the one hand, the pressure plate is matched with the brewing cavity shell 4 in structure and in shape, and on the other hand, the arc-shaped pressure plate can be in contact with the brewing head 1.9 when rotating to different positions. The surface of the arc-shaped pressure plate is provided with several pressure plate rotating shafts 4.5, and the pressure plate rotating shafts 4.5 can rotate to reduce the friction force between the pressure plate 4.3 and the brewing head 1.9 when pressure plate rotating shaft is in contact with the brewing head 1.9, such that the service life is prolonged. Besides the pressure plate rotating shafts 4.5, structural forms such as a rotating wheel capable of rotating can be further adopted.

In the specific embodiment, the filtering portion 3.2 is fixedly connected to the upper end surface of the groove 490 via the first buckling position, the screw or the strong pressure. The filtering portion 3.2 is fixed to filter the coffee grounds so as to prevent the filtering portion 3.2 from swaying or falling off under impact of a water flow.

It can be understood that as the discharge portion and the brewing head 1.9 are not fixedly connected to each other and the brewing head 1.9 only can push the discharge portion to move downwards and cannot drive the discharge portion to restore upwards to an original position. In order to solve the problem, in the specific embodiment, the pressure plate 4.3 is connected to the outer wall of the brewing cavity shell 4 via the elastic element so as to drive the pressure plate 4.3 which has discharged the grounds to restore to the original position.

When the brewing head 1.9 pushes the discharge element to move downwards, the elastic element is stretched, and when the brewing head 1.9 moves upwards to relieve contact with the pressure plate 4.3, the elastic element drives the pressure plate 4.3 to restore to the original position under the action of the elastic restoring force, i.e., the discharge element is returned to the upper end surface of the groove 490. The elastic element can be parts such as the reset spring 4.4 or a Z-type elastic piece.

When the filtering portion 3.2 is fixed to the upper end surface of the groove 490 via the bolt, the filtering portion 3.2 is provided with the first screw hole, the pressure sealing water outlet element 3.3 is provided with the second screw hole, and the upper end surface of the groove 490 is provided with the third screw hole. The filtering portion 3.2 and the pressure sealing water outlet element 3.3 are fixed to the upper end surface of the groove 490 via a bolt which penetrates through the first screw hole, the second screw hole and the third screw hole in sequence. It should be noted that, the filtering portion 3.2 isolates and filters the coffee grounds left after the coffee powder is dissolved, the filtering portion 3.2 presses the pressure sealing water outlet element 3.3 via the bolt to the upper end surface of the groove 490, and when it is needed to replace the filtering portion 3.2 or the pressure sealing water outlet element 3.3, it is convenient to detach the same.

In a specific embodiment with respect to the second power portion, the second power portion includes the second motor 6 arranged on the positioning bracket 2.4 and the liquid outlet pipe 4.7 in coupled transmission to the rotating shaft of the second motor 6 via the gear portion, and the liquid outlet pipe 4.7 is fixedly connected to the brewing cavity shell 4 and is arranged on the axis of the brewing cavity shell 4.

Specifically, the brewing head 1.9 is provided with the ventilation pipe 1.20, the seal ring 1.10 and the dividing cover. The longitudinal axis M of the brewing bracket 2 is provided with the upward linear channel 2.6. The side portion of the linear channel 2.6 is provided with the feed opening 2.7. The longitudinal axis M is perpendicularly or obliquely arranged. The transverse axis H of the brewing bracket 2 is provided with the positioning rotating hole 2.8. The transverse axis H is horizontally or obliquely arranged. The transmission gear pipe 2.3 and the positioning rotating hole 2.8 are concentrically and coaxially arranged. The liquid outlet pipe 4.7 enters the first spigot 2.13, the second spigot 2.41 and the third spigot 2.42 in sequence. The positioning bracket 2.4 and the brewing bracket 2 clamp and sleeve the transmission gear pipe 2.3 in the positioning rotating hole 2.8 of the brewing bracket 2 and the third spigot 2.42 of the positioning bracket 2.4 to be rotatably connected. The outer tooth 4.71 on the liquid outlet pipe 4.7 is in coupled connecting transmission with the inner positioning tooth 2.31 on the transmission gear 2.30, and the transmission gear 2.30 is in coupled connection with the motor gear 2.5 of the second motor 6.

Preferably, the main body of the discharge push rod 3 is fixedly connected to the pressure plate 4.3, and the brewing cavity shell 4 rotates via the outer tooth 4.71 or the liquid outlet pipe 4.7, such that the brewing cavity opening 402 is opened upwards or opened downwards. When the brewing cavity opening 402 is opened upwards, the brewing head 1.9 is sealedly connected to the brewing cavity opening, when the brewing cavity opening 402 is opened downwards and the pressure plate 4.3 moves upwards, the brewing head 1.9 presses downwards to push the pressure plate 4.3 to move downwards, the discharge push rod 3 moves downward to push the coffee grounds out of the brewing chamber 401 via the discharge element, the brewing head 1.9 is lifted out of the brewing chamber 401, and the reset spring 4.4 is restored automatically to shrink the discharge push rod 3 and the discharge element to the bottom position of the brewing chamber 401.

The embodiments in the description are described progressively. Each embodiment puts an emphasis on difference with other embodiments. It may be with reference to same or similar parts of the embodiments, i.e., detailed introduction can be made on the coffee brewer and the brewing cavity thereof provided by the present invention. Particular examples are used herein to explain the principle and embodiments of the present invention, and the above description of the embodiments is only used to help understanding the methods and core concept of the present invention. It should be noted that those skilled in the art further can make several improves and modifications on the present invention without departing from the principle of the present invention, and these improvements and modifications further come within the protection scope of claims of the present invention.

What is claimed is:

1. A brewing cavity, comprising a brewing cavity shell rotatably arranged below a brewing assembly, wherein the brewing cavity shell is internally provided with a brewing chamber for brewing coffee, the brewing cavity shell is provided with a brewing cavity opening that allows the brewing assembly to enter the brewing chamber to compact coffee powder in the brewing chamber and create a brewing pressure for the coffee, a bottom portion of the brewing chamber is provided with a groove with an inner diameter less than an inner diameter of the brewing chamber, a side wall of the groove is provided with a coffee outlet, and the coffee outlet is communicatively connected with an exterior;

a bottom portion of the groove is provided with a through hole with an axis consistent with an axis of the brewing chamber, an inner wall of the through hole is provided with a coffee seal ring, a pressure sealing water outlet element is fixedly mounted on an upper end surface of the groove, the pressure sealing water outlet element is provided with a coffee outlet hole communicated with the coffee outlet, and a filtering portion for filtering coffee is arranged above the pressure sealing water outlet element;

the filtering portion is provided with a first sliding hole, the pressure sealing water outlet element is provided with a second sealing sliding hole, the coffee seal ring is provided with a third sealing sliding hole, the first sliding hole, the second sealing sliding hole and the third sealing sliding hole are internally provided with a discharge portion capable of sliding along the through hole axially; and the discharge portion is at least sealedly and slidably connected to the third sealing sliding hole.

2. The brewing cavity according to claim 1, wherein the inner wall of the through hole is provided with a sealing element fixing position protruding radially inwards, the coffee seal ring is an I-shaped seal ring, and the I-shaped seal ring is clamped on a top surface and a bottom surface of the sealing element fixing position.

3. The brewing cavity according to claim 2, wherein the discharge portion comprises a discharge push rod and a discharge element arranged at an upper end of the discharge push rod, and the discharge push rod is at least sealedly and slidably connected to the third sealing sliding hole.

4. The brewing cavity according to claim 3, wherein the filtering portion is a metal filter screen or a plastic filter screen, the pressure sealing water outlet element is a silica gel element or a rubber element, and the coffee seal ring is a silica gel element or a rubber element.

5. The brewing cavity according to claim 4, wherein the coffee outlet hole is arranged at one side of the second sealing sliding hole or the coffee outlet hole is arranged on the second sealing sliding hole.

6. A coffee brewer, comprising a shell and the brewing cavity according to claim 1 arranged in the shell.

7. The coffee brewer according to claim 6, wherein the brewing assembly comprises a brewing head movably arranged in the shell in an up-down direction, the brewing cavity shell is rotatably arranged below the brewing head, and a diameter of the brewing head is matched with a diameter of the brewing cavity opening;

the brewing head is connected with a first power portion for driving the brewing head to move, and the brewing cavity shell is connected with a second power portion for driving the brewing cavity shell to rotate;

when coffee is being brewed, the second power portion drives the brewing cavity shell to rotate, such that the brewing cavity opening is opposite to the brewing head, and the brewing head is driven by the first powder portion to move downwards to extend into the brewing cavity shell to compact coffee powder in the brewing cavity shell and create the brewing pressure for the coffee; and when coffee grounds are discharged, the second power portion drives the brewing cavity shell to rotate reversely, such that the discharge portion is opposite to the brewing head, and the brewing head is driven by the first power portion to move downwards to push the discharge portion to move downwards, such that the discharge portion pushes the coffee grounds in the brewing chamber to be discharged from the brewing cavity opening.

8. The coffee brewer according to claim 7, wherein the discharge portion comprises a discharge push rod and a discharge element arranged at an upper end of the discharge push rod, a lower portion of the discharge push rod is fixedly connected to a pressure plate, the pressure plate is connected to an outer wall of the brewing cavity shell via an elastic element, one end of the elastic element abuts against a lower end surface of the through hole and another end of the elastic element abuts against the pressure plate, the discharge element is attached to an upper portion of the filtering portion via the elastic element, the brewing head pushes the pressure plate downwards to drive the discharge element to move downwards to discharge the coffee grounds, and the elastic element is configured for driving the pressure plate to an original position after the coffee grounds are driven to be discharged.

9. The coffee brewer according to claim 8, wherein the elastic element is a reset spring, and a lower end of the discharge push rod penetrates through a middle hole of the reset spring and is connected to the pressure plate.

10. The coffee brewer according to claim 9, wherein the first power portion comprises a first motor and a convex driving curved bar connected to a rotating shaft of the first motor, and a swing portion on a top portion of the driving curved bar is rotatably connected to a top portion of the brewing head via an oscillating bar, such that the brewing head moves along a linear channel arranged in the shell;

or, the rotating shaft of the first motor is rotatably connected to the top portion of the brewing head through a screw for driving, such that the brewing head moves along the linear channel arranged in the shell, the brewing head controls an up-down moving distance of the brewing head via a microswitch driving position, the brewing head is provided with a water inlet joint or a lug, and a brewing bracket is provided with a sliding groove that is consistent with a length direction of the screw and is slidably matched with the water inlet joint or the lug.

11. The coffee brewer according to claim 10, wherein the shell is provided with a limiting block for limiting rotation of the driving curved bar, and the limiting block is arranged on a rotating trajectory on one side of the driving curved bar to prevent the brewing head from moving upwards or swinging under an action of hot water in the brewing cavity shell when water flows in.

12. The coffee brewer according to claim 11, wherein a width of a curved bar stopping portion in contact with the swing portion on the limiting block is at least a half of a width of the swing portion.

13. The coffee brewer according to claim 12, wherein the brewing head is provided with a ventilation pipe penetrating through an axial direction of the brewing head, a steam buoyancy valve capable of floating along with the hot water in the brewing cavity shell is arranged below the ventilation pipe, and when water vapor in the brewing cavity shell is discharged from the ventilation pipe, the steam buoyancy valve floats upwards along with the hot water in the brewing cavity shell to block the ventilation pipe.

14. The coffee brewer according to claim 13, wherein the pressure plate is an arc-shaped pressure plate opened toward a direction of the discharge push rod, and a surface of the arc-shaped pressure plate is provided with several pressure plate rotating shafts for contacting the brewing head.

15. The coffee brewer according to claim 14, wherein the filtering portion is fixedly connected to the upper end surface of the groove via a first buckling position, a screw or a pressure.

16. The coffee brewer according to claim 15, wherein the second power portion comprises a second motor arranged on a positioning bracket and a liquid outlet pipe in coupling transmission with a rotating shaft of the second motor via a gear portion, and the liquid outlet pipe is fixedly connected to the brewing cavity shell and is arranged on an axis of the brewing cavity shell.

* * * * *